(12) United States Patent
Loncar et al.

(10) Patent No.: US 12,247,350 B2
(45) Date of Patent: Mar. 11, 2025

(54) PROCESS AND APPARATUS FOR DYEING TEXTILES

(71) Applicants: Sanko Tekstil Isletmeleri San. Ve Tic. A.S., Inegol-Bursa (TR); RIJKSUNIVERSITEIT GRONINGEN, Groningen (NL)

(72) Inventors: Nikola Loncar, Groningen (NL); Jitka Eryilmaz, Inegol-Bursa (TR); Ece Senel, Inegol-Bursa (TR); Gokhan Kaplan, Inegol-Bursa (TR); Marco Fraaije, Groningen (NL); Ozgur Cobanoglu, Inegol-Bursa (TR)

(73) Assignees: SANKO TEKSTIL ISLETMELERI SAN. VE TIC. A.S., Bursa (TR); RIJKSUNIVERSITEIT GRONINGEN, Groningen (NL)

( * ) Notice: Subject to any disclaimer, the term of this patent is extended or adjusted under 35 U.S.C. 154(b) by 948 days.

(21) Appl. No.: 17/261,343

(22) PCT Filed: Jul. 20, 2018

(86) PCT No.: PCT/EP2018/069820
§ 371 (c)(1),
(2) Date: Jan. 19, 2021

(87) PCT Pub. No.: WO2020/015839
PCT Pub. Date: Jan. 23, 2020

(65) Prior Publication Data
US 2021/0262162 A1    Aug. 26, 2021

(51) Int. Cl.
| D06P 1/22 | (2006.01) |
| C08B 7/00 | (2006.01) |
| C09B 7/00 | (2006.01) |
| C09B 67/00 | (2006.01) |
| C09B 67/30 | (2006.01) |
| D06B 1/04 | (2006.01) |
| D06P 1/44 | (2006.01) |

(52) U.S. Cl.
CPC ............... *D06P 1/228* (2013.01); *C09B 7/00* (2013.01); *C09B 67/0078* (2013.01); *D06B 1/04* (2013.01); *D06P 1/445* (2013.01)

(58) Field of Classification Search
CPC . D06P 1/228; D06P 1/445; C09B 7/00; C08B 67/0078; D06B 1/04
See application file for complete search history.

(56) References Cited

U.S. PATENT DOCUMENTS

2003/0054519 A1    3/2003   Weyler et al.
2009/0265867 A1    10/2009  Ronchi

FOREIGN PATENT DOCUMENTS

| EP | 0 288 092 | 10/1988 |
| JP | 2011026730 | * 2/2011 |
| WO | 20180002379 | 1/2018 |

OTHER PUBLICATIONS

Yan et al. Production of Indigo by Immobilization of *E. coli* BL21 (DE3) Cells in Calcium-Alginate Gel Capsules. Chinese Journal of Chemical Engineering, vol. 15, Issue 3, Jun. 2007, pp. 387-390.*
Rioz-Martinez et al. Exploring the biocatalytic scope of a bacterial flavin-containing monooxygenase. Org Biomol Chem. Mar. 7, 2011;9(5):1337-41. doi: 10.1039/c0ob00988a. Epub Jan. 11, 2011.*
Sebek et al. Divergent pathways of indole metabolism in Chromobacterium violaceum. Nature. Nov. 24, 1962:196:793-5.*
International search report and written opinion issued on Apr. 24, 20219 for PCT/EP2018/069820.
Anonymous: "Indigo Encyclopedia.com" 2016, XP055578266, Retrieved from the Internet: URL:https://www.encyclopedia.com/science-a nd-technology/chemistry/organic-chemistry/ indi go [retrieved on Apr. 5, 2019] The Manufacturing Process: Natural extraction.
Ana Rioz-Martinez et al: "Exploring the biocatalytic scope of a bacterial flavin-containing monooxygenase", Organic & Biomolecular Chemistry, vol. 9, No. 5, 2011, p. 1337, XP055578275, ISSN: 1477-0520, 001:10.1039/c0ob00988a Conclusions; p. 1339, column second.

* cited by examiner

*Primary Examiner* — Amina S Khan
(74) *Attorney, Agent, or Firm* — Silvia Salvadori

(57) ABSTRACT

This invention relates to a process and apparatus for dyeing of textiles, to an immobilized enzyme comprised in said apparatus required for carrying out the process, and to a method to produce enzymatically indigo and derivatives thereof.

11 Claims, 9 Drawing Sheets
Specification includes a Sequence Listing.

SEQUENCE LISTING

<160> NUMBER OF SEQ ID NOS: 3

<210> SEQ ID NO 1

```
<211> LENGTH: 513
<212> TYPE: PRT
<213> ORGANISM: Streptomyces violaceusniger

<400> SEQUENCE: 1
```

| | | | | | | | | | | | | | | |
|---|---|---|---|---|---|---|---|---|---|---|---|---|---|---|
| Leu | Asn | Asn | Val | Val | Ile | Val | Gly | Gly | Gly | Thr | Ala | Gly | Trp | Met | Thr |
| 1 | | | | 5 | | | | | 10 | | | | | 15 | |

Ala Ser Tyr Leu Lys Ala Ala Phe Gly Asp Arg Ile Asp Ile Thr Leu
            20                  25                  30

Val Glu Ser Gly His Ile Gly Val Gly Val Gly Ala Thr Phe
        35                  40                  45

Ser Asp Ile Arg His Phe Phe Glu Phe Leu Gly Leu Lys Glu Lys Asp
 50                  55                  60

Trp Met Pro Ala Cys Asn Ala Thr Tyr Lys Leu Ala Val Arg Phe Glu
 65                  70                  75                  80

Asn Trp Arg Glu Lys Gly His Tyr Phe Tyr His Pro Phe Glu Gln Met
                85                  90                  95

Arg Ser Val Asn Gly Phe Pro Leu Thr Asp Trp Trp Leu Lys Gln Gly
            100                 105                 110

Pro Thr Asp Arg Phe Asp Lys Asp Cys Phe Val Met Ala Ser Val Ile
        115                 120                 125

Asp Ala Gly Leu Ser Pro Arg His Gln Asp Gly Thr Leu Ile Asp Gln
130                 135                 140

Pro Phe Asp Glu Gly Ala Asp Glu Met Gln Gly Leu Thr Met Ser Glu
145                 150                 155                 160

His Gln Gly Lys Thr Gln Phe Pro Tyr Ala Tyr Gln Phe Glu Ala Ala
                165                 170                 175

Leu Leu Ala Lys Tyr Leu Thr Lys Tyr Ser Val Glu Arg Gly Val Lys
            180                 185                 190

His Ile Val Asp Asp Val Arg Glu Val Ser Leu Asp Asp Arg Gly Trp
        195                 200                 205

Ile Thr Gly Val Arg Thr Gly Glu His Gly Asp Leu Thr Gly Asp Leu
210                 215                 220

Phe Ile Asp Cys Thr Gly Phe Arg Gly Leu Leu Leu Asn Gln Ala Leu
225                 230                 235                 240

Glu Glu Pro Phe Ile Ser Tyr Gln Asp Thr Leu Pro Asn Asp Ser Ala
                245                 250                 255

Val Ala Leu Gln Val Pro Met Asp Met Glu Arg Arg Gly Ile Leu Pro
            260                 265                 270

Cys Thr Thr Ala Thr Ala Gln Asp Ala Gly Trp Ile Trp Thr Ile Pro
        275                 280                 285

Leu Thr Gly Arg Val Gly Thr Gly Tyr Val Tyr Ala Lys Asp Tyr Leu
290                 295                 300

Ser Pro Glu Glu Ala Glu Arg Thr Leu Arg Glu Phe Val Gly Pro Ala
305                 310                 315                 320

Ala Ala Asp Val Glu Ala Asn His Ile Arg Met Arg Ile Gly Arg Ser
                325                 330                 335

Arg Asn Ser Trp Val Lys Asn Cys Val Ala Ile Gly Leu Ser Ser Gly
            340                 345                 350

Phe Val Glu Pro Leu Glu Ser Thr Gly Ile Phe Ile His His Ala
        355                 360                 365

Ile Glu Gln Leu Val Lys Asn Phe Pro Ala Ala Asp Trp Asn Ser Met
370                 375                 380

His Arg Asp Leu Tyr Asn Ser Ala Val Ser His Val Met Asp Gly Val

```
                385                 390                 395                 400
Arg Glu Phe Leu Val Leu His Tyr Val Ala Ala Lys Arg Asn Asp Thr
                    405                 410                 415
Gln Tyr Trp Arg Asp Thr Lys Thr Arg Lys Ile Pro Asp Ser Leu Ala
                420                 425                 430
Glu Arg Ile Glu Lys Trp Lys Val Gln Leu Pro Asp Ser Glu Thr Val
                    435                 440                 445
Tyr Pro Tyr Tyr His Gly Leu Pro Pro Tyr Ser Tyr Met Cys Ile Leu
                450                 455                 460
Leu Gly Met Gly Gly Ile Glu Leu Lys Pro Ser Pro Ala Leu Ala Leu
465                 470                 475                 480
Ala Asp Gly Gly Ala Ala Gln Arg Glu Phe Glu Gln Ile Arg Asn Lys
                    485                 490                 495
Thr Gln Arg Leu Thr Glu Val Leu Pro Lys Ala Tyr Asp Tyr Phe Thr
                500                 505                 510
Gln

<210> SEQ ID NO 2
<211> LENGTH: 538
<212> TYPE: PRT
<213> ORGANISM: Pseudomonas fluorescens

<400> SEQUENCE: 2

Met Asn Lys Pro Ile Lys Asn Ile Val Ile Val Gly Gly Gly Thr Ala
1               5                   10                  15
Gly Trp Met Ala Ala Ser Tyr Leu Val Arg Ala Leu Gln Gln Gln Val
                20                  25                  30
Asn Ile Thr Leu Ile Glu Ser Ala Ala Ile Pro Arg Ile Gly Val Gly
                    35                  40                  45
Glu Ala Thr Ile Pro Ser Leu Gln Lys Val Phe Phe Asp Phe Leu Gly
        50                  55                  60
Ile Pro Glu Arg Glu Trp Met Pro Gln Val Asn Gly Ala Phe Lys Ala
65                  70                  75                  80
Ala Ile Lys Phe Val Asn Trp Arg Lys Pro Pro Asp His Ser Arg Asp
                85                  90                  95
Asp Tyr Phe Tyr His Leu Phe Gly Ser Val Pro Asn Cys Asp Gly Val
                    100                 105                 110
Pro Leu Thr His Tyr Trp Leu Arg Lys Arg Glu Gln Gly Phe Gln Gln
        115                 120                 125
Pro Met Glu Tyr Ala Cys Tyr Pro Gln Pro Gly Ala Leu Asp Gly Lys
                130                 135                 140
Leu Ala Pro Cys Leu Leu Asp Gly Thr Arg Gln Met Ser His Ala Trp
145                 150                 155                 160
His Phe Asp Ala His Leu Val Ala Asp Phe Leu Lys Arg Trp Ala Val
                165                 170                 175
Glu Arg Gly Val Asn Arg Val Val Asp Glu Val Val Glu Val Arg Leu
                    180                 185                 190
Asn Asp Arg Gly Tyr Ile Ser Thr Leu Leu Thr Lys Glu Gly Arg Thr
        195                 200                 205
Leu Glu Gly Asp Leu Phe Ile Asp Cys Ser Gly Met Arg Gly Leu Leu
                210                 215                 220
Ile Asn Gln Ala Leu Lys Glu Pro Phe Ile Asp Met Ser Asp Tyr Leu
225                 230                 235                 240
Leu Cys Asp Ser Ala Val Ala Ser Ala Val Pro Asn Asp Asp Val Arg
```

```
                        245                 250                 255
    Glu Gly Val Glu Pro Tyr Thr Ser Ala Ile Ala Met Asn Ser Gly Trp
                260                 265                 270

Thr Trp Lys Ile Pro Met Leu Gly Arg Phe Gly Ser Gly Tyr Val Phe
                275                 280                 285

Ser Ser Lys Phe Thr Ser Arg Asp Gln Ala Thr Ala Asp Phe Leu Asn
                290                 295                 300

Leu Trp Gly Leu Ser Asp Asn Gln Ser Leu Asn Gln Ile Lys Phe Arg
    305                 310                 315                 320

Val Gly Arg Asn Lys Arg Ala Trp Val Asn Asn Cys Val Ser Ile Gly
                    325                 330                 335

Leu Ser Ser Cys Phe Leu Glu Pro Leu Glu Ser Thr Gly Ile Tyr Phe
                    340                 345                 350

Ile Tyr Ala Ala Leu Tyr Gln Leu Val Lys His Phe Pro Asp Thr Ser
                    355                 360                 365

Phe Asp Pro Arg Leu Ser Asp Ala Phe Asn Ala Glu Ile Val Tyr Met
                    370                 375                 380

Phe Asp Cys Arg Asp Phe Val Gln Ala His Tyr Phe Thr Thr Ser
    385                 390                 395                 400

Arg Glu Asp Thr Pro Phe Trp Leu Ala Asn Arg His Glu Leu Arg Leu
                    405                 410                 415

Ser Asp Ala Ile Lys Glu Lys Val Gln Arg Tyr Lys Ala Gly Leu Pro
                    420                 425                 430

Leu Thr Thr Thr Ser Phe Asp Asp Ser Thr Tyr Tyr Glu Thr Phe Asp
                    435                 440                 445

Tyr Glu Phe Lys Asn Phe Trp Leu Asn Gly Asn Tyr Tyr Cys Ile Phe
                    450                 455                 460

Ala Gly Leu Gly Met Leu Pro Asp Arg Ser Pro Leu Leu Gln His
    465                 470                 475                 480

Arg Pro Glu Ser Ile Glu Lys Ala Glu Ala Met Phe Ala Ser Ile Arg
                    485                 490                 495

Arg Glu Ala Glu Arg Leu Arg Thr Ser Leu Pro Thr Asn Tyr Asp Tyr
                    500                 505                 510

Leu Arg Ser Leu Arg Asn Gly Asp Ala Gly Gln Ser Arg Asn Gln Arg
                    515                 520                 525

Gly Pro Thr Leu Ala Ala Lys Glu Gly Leu
                    530                 535

<210> SEQ ID NO 3
<211> LENGTH: 174
<212> TYPE: PRT
<213> ORGANISM: Bacillus subtilis

<400> SEQUENCE: 3

Met Lys Val Leu Val Leu Ala Phe His Pro Asn Met Glu Gln Ser Val
1               5                   10                  15

Val Asn Arg Ala Phe Ala Asp Thr Leu Lys Asp Ala Pro Gly Ile Thr
                20                  25                  30

Leu Arg Asp Leu Tyr Gln Glu Tyr Pro Asp Glu Ala Ile Asp Val Glu
            35                  40                  45

Lys Glu Gln Lys Leu Cys Glu Glu His Asp Arg Ile Val Phe Gln Phe
        50                  55                  60

Pro Leu Tyr Trp Tyr Ser Ser Pro Pro Leu Leu Lys Lys Trp Leu Asp
65                  70                  75                  80
```

-continued

```
His Val Leu Leu Tyr Gly Trp Ala Tyr Gly Thr Asn Gly Thr Ala Leu
            85              90              95

Arg Gly Lys Glu Phe Met Val Ala Val Ser Ala Gly Ala Pro Glu Glu
            100             105             110

Ala Tyr Gln Ala Gly Gly Ser Asn His Tyr Ala Ile Ser Glu Leu Leu
            115             120             125

Arg Pro Phe Gln Ala Thr Ser Asn Phe Ile Gly Thr Thr Tyr Leu Pro
            130             135             140

Pro Tyr Val Phe Tyr Gln Ala Gly Thr Ala Gly Lys Ser Glu Leu Ala
145             150             155             160

Glu Gly Ala Thr Gln Tyr Arg Glu His Val Leu Lys Ser Phe
            165             170
```

PROCESS AND APPARATUS FOR DYEING TEXTILES

This application is a U.S. national stage of PCT/EP2018/069820 filed on 20 Jul. 2018 the content of which is incorporated herein by reference in its entirety.

This invention relates to a process and apparatus for dyeing of textiles, as well as to an immobilized enzyme comprised in said apparatus required for carrying out the process.

BACKGROUND OF THE INVENTION

Vat dyes are insoluble dyes that require a reducing agent to be solubilized in water. Conventionally, dyeing with vat dyes includes applying the dye in its soluble, reduced form to the textiles and subsequently oxidizing the dye back to the insoluble form, which confers color to the textile.

Indigo is a vat dye of Formula I:

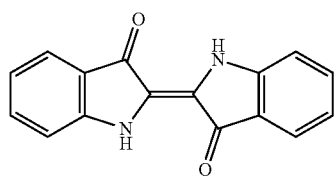

Formula I

Substitutions on the indigo aromatic ring(s) with groups such as halogen, alkyl, alkoxy, amino, aryl, aryloxy, and carbonyl, provide compounds that span in a wide range of colors other than blue, and are part of the so-called indigo derivatives.

A large percentage of indigo and indigo derivatives is produced via synthesis. Heumann synthesis (Scheme 1 below) and Pfleger synthesis (Scheme 2 below) were the first synthetic routes used for indigo manufacturing at industrial scale; variations of these methods are still in use today.

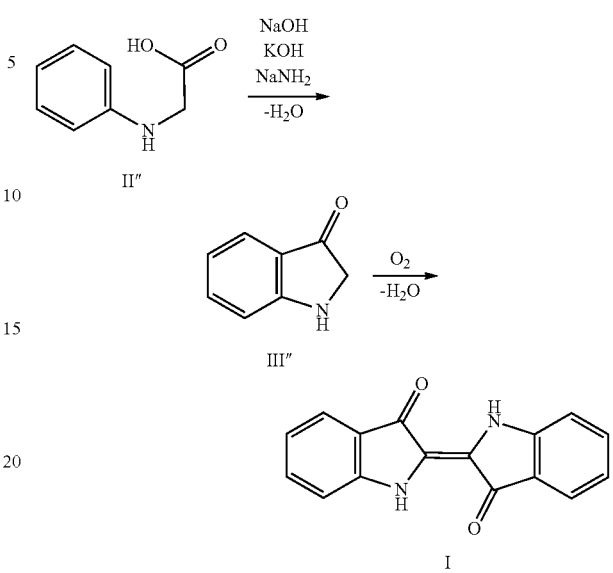

Scheme 2

The above synthetic routes are also used to manufacture indigo derivatives; in this case, compounds II', II'', III' and III'' are substituted in the same position(s) with the same group(s) as in the desired indigo derivative to be synthesized.

Synthesis of indigo and derivatives thereof, as well as other vat dyes, can also be carried out by means of enzymes, or by bacteria expressing enzymes. However, such enzymatic synthesis are not employed in industrial processes.

While precursors of indigo (such as compounds II', II'', III' and III'' of Schemes 1 and 2 above) are soluble in aqueous solutions, indigo is not, and it precipitates after its synthesis in aqueous solutions. Therefore, as said above, indigo or derivatives thereof have to be reduced (by treatment with reducing agents, for example as shown in Scheme 3).

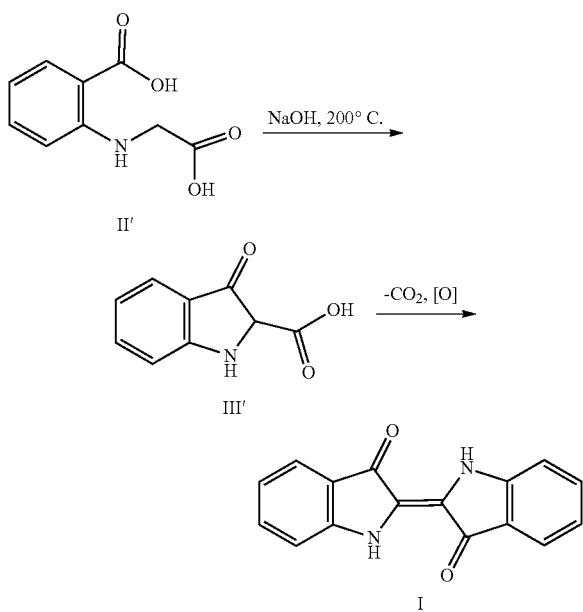

Scheme 1

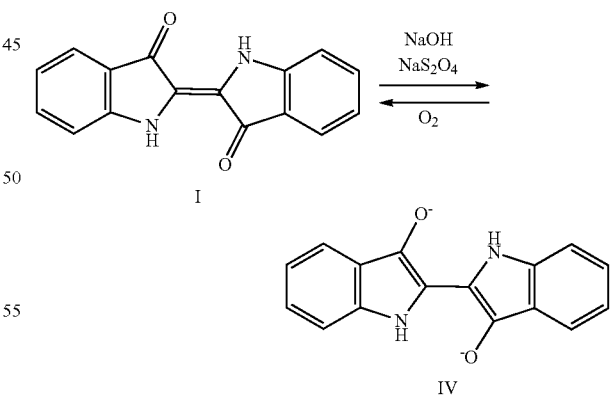

Scheme 3 wherein compound I is indigo, and compound IV is the water soluble and reduced form of indigo, called leuco-indigo (or indigo white, as it is colorless).

Therefore, industrial dyeing methods using indigo or derivatives thereof as a dye, or using vat dyes in general, comprise first the synthesis in aqueous solution of indigo or derivatives thereof (or of vat dyes) in reactors through known methods (e.g. the synthetic route of Scheme 1 above). Indigo or derivatives thereof (or vat dyes) are obtained as a precipitate. The aqueous solution comprising suspended indigo or derivatives thereof (or the vat dyes) is then treated with reducing agents to obtain an aqueous solution comprising dissolved leuco-indigo or derivatives thereof (or reduced-vat dyes). The aqueous solution comprising dissolved leuco-indigo or derivatives thereof (or reduced-vat dyes) is then applied onto textiles. Once the solution comprising dissolved leuco-indigo wets the textiles, indigo or derivatives thereof (or the vat dyes) are obtained by oxidation of leuco-indigo or derivatives thereof (or leuco-vat dye), and the textiles are thus dyed. Such oxidation can be carried out, for example, with the oxygen in the air. Usually, the indigo dyeing process requires several impregnation and oxidation steps to reach the desired shade of colour.

The reducing agents used to reduce insoluble vat dyes, such as indigo or derivatives thereof, are harsh chemicals, i.e. hazardous chemicals for users and/or environment, such as sodium hydroxide and sodium hydrosulfite. Indeed, large quantities of reducing salts and hydroxides are used in conventional dyeing processes wherein, for example, indigo or derivatives thereof are used as dyes, thus generating great amounts of wastewater that must be treated before being disposed. This step adds to costs of the dyeing process.

There is thus a need for an improved method for dyeing textiles with vat dyes, in particular with indigo and derivatives thereof, that reduces the cost for vat dyeing and of the water treatment processes.

A further problem with known indigo dyeing process is that the textile, especially cellulose, may be damaged by extended exposure to the alkaline process solution and to the by-product therein present.

SUMMARY OF THE INVENTION

Aim of the present invention is to solve the above problem and to provide a process for dyeing textiles using insoluble dyes, such as vat dyes, in particular using indigo and derivatives thereof, that is safe, cost-effective and environmentally friendly.

Another aim of the present invention is to provide a process for dyeing textiles using indigo and derivatives thereof, as well as insoluble dyes, such as vat dyes, that is more sustainable with respect to conventional dyeing methods using indigo and derivatives thereof, or vat dyes in general.

The above aims, as well as others, are reached through the present invention that provides a process for dyeing a textile, comprising an enzymatic synthesis of a dye precursor, characterized in that it comprises the following steps:
 a) contacting a solution comprising at least a first dye precursor with at least a first immobilized enzyme, to convert at least part of said first dye precursor into at least a second dye precursor, to obtain a solution comprising said second dye precursor;
 b) generating a flow of the solution comprising the second dye precursor, whereby the solution comprising said second dye precursor flows from the first immobilized enzyme to the textile;
 c) contacting the solution comprising the second dye precursor with a textile; and
 d) converting at least part of the second dye precursor to at least one dye, whereby at least part of the textile is dyed;
wherein said first immobilized enzyme is spaced apart from the textile.

In the following description, "textile" or "textiles" refer to any fibers, yarns, ropes, fabrics and/or garments able to be dyed, for example by indigo and/or derivatives thereof. The textile materials may be of natural origin, such as the ones deriving from animals or plants, e.g. cotton, linen, silk, wool, etc., or may be of synthetic origin, or may be mixtures thereof, such as elasticized cotton fabrics or garments. Moreover, said yarns may be manufactured by any known method, and said fabrics also may be manufactured by any known method, such as weaving, knitting, crocheting, knotting, and felting. Furthermore, said garments may be any garment, such as jeans, shirts, casual wear garments, etc.

In the present invention, "first dye precursor" refers to any soluble compound that can be converted enzymatically into a second dye precursor. In the present invention, "second dye precursor" refers to any soluble compound that can be obtained by a first dye precursor and can be converted to an insoluble dye, for example via dimerization. In the present invention, "insoluble dye" refers to any water-insoluble compound that is conventionally used to dye textiles, for example any vat dye, such as indigo. Therefore, according to the present invention, first dye precursor, second dye precursor and insoluble dye are related to each other via a synthetic route, in particular a synthetic route comprising a first enzymatic step and a second non-enzymatic step. For example, said first dye precursor, said second dye precursor and said insoluble dye according to the present invention can be, respectively, indole and/or derivatives thereof, indoxyl and/or derivatives thereof, and indigo and/or derivatives thereof, and are related as represented in Scheme 4 reported below. Which first dye precursor has to be comprised in the solution of step a) is chosen according to the color the textiles to be dyed must have at the end of the dyeing process of the invention, as the color of the textiles will be provided by the insoluble dye and the insoluble dye is obtained starting from the first dye precursor.

Advantageous examples of first dye precursor, second dye precursor, and insoluble dye are, respectively, indole and/or derivatives thereof, indoxyl and/or derivatives thereof, and indigo and/or derivatives thereof. Indigo and its derivatives can be synthesized starting from indole and its derivatives thereof, as represented in Scheme 4 below.

Scheme 4

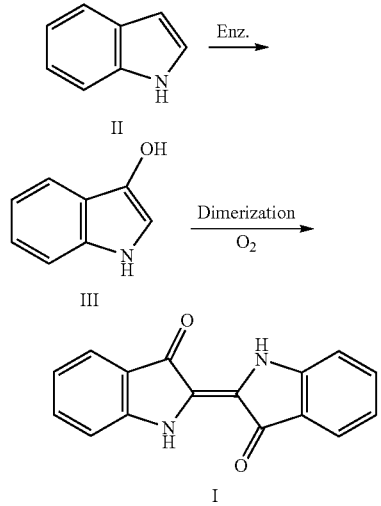

wherein compound II is indole (first dye precursor), compound III is indoxyl (second dye precursor), and compound I is indigo (the dye). In particular, with reference to Scheme 4 reaction, the addition of a hydroxyl group to the carbon in position 3 of indole provides indoxyl, which dimerize into indigo when in aqueous solution. According to the present invention, the addition of a hydroxyl group to indole and/or derivatives thereof is carried out by the first immobilized enzymes in step a) of the process of the invention. When the first dye precursor is indole and/or derivatives thereof, the second dye precursor is indoxyl and/or derivatives thereof, and the insoluble dye is indigo and/or derivatives thereof, the process of the invention results in dyeing textiles with indigo and/or derivatives thereof, which are ones of the most used dyes in textile dyeing, without passing through the reduction steps of the prior art.

According to the present invention, "indole derivatives", "indoxyl derivatives" and "indigo derivatives" refer to respectively indole, indoxyl and indigo substituted by one or more substituents, for example substituted by: one or more groups on one or more carbons in any position selected from positions 4, 5, 6 and 7 of indole or indoxyl, and from positions 4, 4', 5, 5', 6, 6', 7, and 7' of indigo, and/or by a group on the nitrogen atom(s) of indole, indoxyl or indigo. The one or more groups substituting one or more carbons may be groups such as, but not limited to, halogen groups, alkyl groups (e.g. $C_1$-$C_{20}$ alkyl groups, such as methyl, ethyl, propyl, isopropyl, butyl, tert-butyl, and iso-butyl), alkoxy groups (e.g. $C_1$-$C_{20}$ alkoxy groups, such as methoxy, ethoxy, butoxy, tert-butoxy, and iso-butoxy), aryl groups (e.g. phenyl, substituted phenyl, benzyl, substituted benzyl, naphthyl, anthracenyl, and heteroaryl), aryloxy groups (e.g. phenoxy, and naphyloxy), amine groups (e.g. primary and/or secondary aliphatic and/or aromatic amine groups), nitro groups and carbonyl groups (e.g. aldehyde groups, such as aromatic and/or aliphatic aldehyde, and ketones, such as aromatic and/or aliphatic ketones). The group substituting nitrogen atom(s) may be groups such as, but not limited to, alkyl groups (e.g. $C_1$-$C_{20}$ alkyl groups, such as methyl, ethyl, propyl, isopropyl, butyl, tert-butyl, and iso-butyl), aryl groups (e.g. phenyl, substituted phenyl, benzyl, substituted benzyl, naphthyl, anthracenyl, and heteroaryl), and acyl groups (such as formyl, acetyl, propionyl, benzoyl, and acryloyl). Therefore, indole derivatives may be, for example, 4-chloroindole, 5-chloroindole, 6-chloroindole, 7-chloroindole, 5-bromoindole, 6-bromoindole, 5-nitroindole, 5-hydroxyindole, 5-methylindole, 5-methoxyindole, 6-methylindole, 7-methylindole, 5-aminoindole, 1-methylindole, indole-6-carboxaldehyde; and indoxyl derivatives can be, for example, 4-chloroindoxyl, 5-chloroindoxyl, 6-chloroindoxyl, 7-chloroindoxyl, 5-bromoindoxyl, 6-bromoindoxyl, 5-nitroindoxyl, 5-hydroxyindoxyl, 5-methylindoxyl, 5-methoxyindoxyl, 6-methylindoxyl, 7-methylindoxyl, 5-aminoindoxyl, 1-methylindoxyl, indoxyl-6-carboxaldehyde. It is encompassed in the present invention also the use of any other indole and indoxyl derivatives, provided that such indole derivatives can be reacted and converted into the correspondent indoxyl derivatives by enzymatic catalysis. These indoxyl derivatives, when converted (i.e. dimerized according to step d) of the process of the invention), provide the correspondent indigo derivatives, which have each a different color. According to the present invention, "indigo derivatives" refer also to asymmetric indigo, i.e. indigo deriving from dimerization of two different indoxyl derivatives, or of indoxyl and an indoxyl derivative. Dyeing of the textile with asymmetric indigo can be achieved according to the process of the invention when a solution comprising two or more different indole derivatives, or indole and one or more indole derivatives, is contacted with the enzyme in step a). For example, when two different indole derivatives, or indole and an indole derivative, are contacted with the first immobilized enzyme (step a)), two different indoxyl derivatives, or indoxyl and an indoxyl derivative, are obtained; which are subsequently contacted to the textile according to step c) of the process. When such two different indoxyl derivatives, or indoxyl and an indoxyl derivative, convert to at least a dye according to step d) of the process, three different indigo derivatives are obtained, namely two different symmetric indigo derivatives and an asymmetric indigo derivative (for example, as represented in Scheme 5 below), and the textile is thus dyed with more than one dye, one of which is asymmetric indigo.

Scheme 5

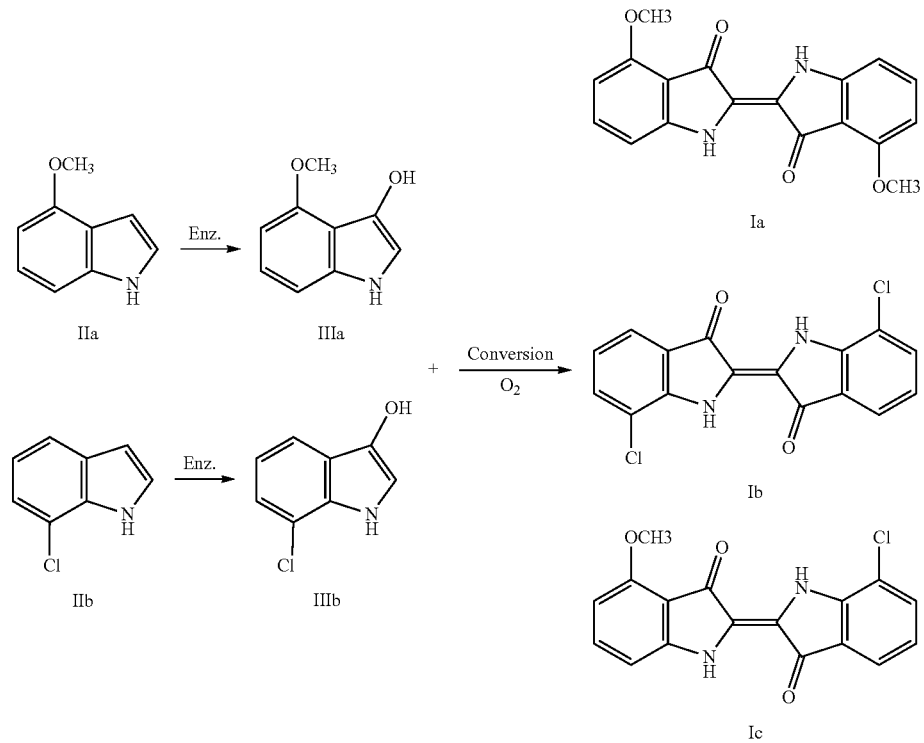

With reference to Scheme 5, the two different indole derivatives are compounds IIa (4-methoxyindole) and IIb (7-chloroindole), the two different indoxyl derivatives are compounds IIIa (4-methoxyindoxyl) and IIIb (7-chloroindoxyl), and the three different indigo derivatives are compounds Ia (4,4'-dimethoxyindigo or 4-methoxy-2-(4-methoxy-3-oxo-1,3-dihydro-2H-indol-2-ylidene)-1,2-dihydro-3H-indol-3-one; symmetric indigo derivative), Ib (7,7'-dichloroindigo or 7-chloro-2-(7-chloro-3-oxo-1,3-dihydro-2H-indol-2-ylidene)-1,2-dihydro-3H-indol-3-one; symmetric indigo derivative), and Ic (7-chloro-4'-methoxyindigo or 7-chloro-2-(4-methoxy-1,3-dihydro-3-oxo-2H-indol-2-ylidene)-1,2-dihydro-3H-indol-3-one; asymmetric indigo derivative). Therefore, when at least two indole derivatives, or indole and at least one indole derivative, are contacted with the enzyme, more than one indigo derivatives can be obtained in step d) of the process, whereby dyeing of textile with more than one dye is achieved according to the process of the invention.

According to the present invention, "first immobilized enzymes" refer to any enzymes able to catalyze the conversion of a first dye precursor to a second dye precursor according to step a) of the process of the invention. For example, the first immobilized enzyme can be an immobilized enzyme that is able to catalyze the conversion (i.e. oxidation) of indole and/or derivatives thereof to indoxyl and/or derivatives thereof.

According to the present invention, contacting any compound to enzymes, such as the first dye precursor to the immobilized enzyme in step a), means allowing such compound to be converted enzymatically. This contacting can be carried out by contacting a flow of the solution comprising at least such first dye precursor to the enzyme, whereby the dissolved first dye precursor comprised in such solution contacts in turn the immobilized enzyme and is converted enzymatically to the second dye precursor.

According to the present invention, contacting the solution comprising at least the second dye precursor with a textile, means wetting the textile with such solution, whereby the textile is impregnated with such solution in which the second dye precursor is dissolved.

According to the present invention, "immobilized" or "immobilization" refer to the immobilization process of enzymes. Immobilization of enzymes is a conventional process known in the art, which involves the attachment, preferably covalent attachment, of such enzymes to carriers, for example to epoxy-activated resins (such as methacrylate copolymers, e.g. Eupergit®, SepaBeads®, Relizyme™, Purolite®), cellulose, agarose, polystyrenic ion exchange resins, amino acrylate resins, hydrogels (immobilization by occlusion; e.g. agarose, alginate, carrageenan or gelatin), chelating carriers (e.g. Ni-Sepharose®, IDA-Sepharose®, NTA-Sepharose®, IDA-Agarose and derivatives of), etc. The type of carriers used to immobilize enzymes might depend on which are the exposed groups of the enzymes. For example, if surface amino groups are exposed on the enzymes, epoxy-activated resins may be used as carriers: as the amino groups covalently attaches to the epoxy groups of the epoxy-activated resins, the enzymes are immobilized onto the epoxy-activated resins. According to the invention, immobilization may be carried out by incubating the enzymes and epoxy-activated resins with agitation for 12 h in a 100 mM potassium-phosphate solution of pH 8.0 with 0.5 M NaCl. Advantageously, the remaining (unreacted) activated groups of the carriers are inactivated after immobilization has been carried out; for example, inactivation of the remaining activated groups is carried out by incubating 10 mM ethanolamine or 10 mM glycine in the solution comprising epoxy-activated resins.

Suitable epoxy-activated resins have particle size comprised in the range from 100 to 1100 micron, e.g. from 150 to 300 micron, or from 200 to 500 micron, or from 250 to 1000 microns, with mean pore diameter comprised in the range from 300 to 1800 angstroms, for example from 300 to 600 angstroms, or 1200 to 1800 angstroms. In an aspect of the invention, immobilization of enzymes can be carried out in a ratio comprised in the range of 5-75 mg of (semi) purified enzymes per gram of wet carrier, more preferably in a ratio comprised in the range of 15-25 mg of (semi)purified enzymes per gram of the wet carrier.

Mutant enzymes (e.g. genetically modified enzymes) can be employed in the process of the invention, for example in order to increase the catalyzing efficiency or to provide an improved binding to carriers. For example, when the carriers used to immobilize the enzymes are epoxy-activated resins, the enzymes can be modified with the introduction of a hexalysine (6×Lys) or a hexahistidine (6×His) tag sequence, preferably on the N-terminus, to increase their binding to carriers.

According to the present invention, "spaced apart" refers to spacing the first immobilized enzyme and the textile so that conversion of the second dye precursor to the insoluble dye does not occur at and/or near said first immobilized enzyme, and occurs instead after the solution comprising the second dye precursor is contacted with the textile. Therefore, conversion of the second dye precursor to the insoluble dye is obtained directly onto the textiles. According to the invention, the textiles are thus located downstream of the immobilized enzyme with respect to the direction of the flow of the solution. The enzymes are immobilized so that they are confined and cannot flow along with the flow of the solution. Such spacing can be carried out, for example, by separating the immobilized enzyme (or enzyme system) and textile in different containers or chambers, or by confining the immobilized enzyme (or enzyme system) and said textile in different areas of the same container or chamber. Parameters of the solution, such as flow rate, temperature, and contact time of the solution with the enzyme and the textile, may be selected to ensure that conversion of the second dye precursor to the insoluble dye occurs substantially on the textile, i.e. after the solution comprising at least the second dye precursor is contacted with the textile.

Therefore, according to the present invention, conversion (i.e. precipitation) of the second dye precursor to the insoluble dye at and/or near said first immobilized enzyme is substantially prevented. It was found by the applicant that precipitation of insoluble dye at and/or near the enzymes may result on a loss of enzyme activity; it is deemed that the precipitated insoluble dye negatively affects the substrate-enzyme interaction, preventing further contact of the substrate (i.e. the first dye precursor) with the immobilized enzyme.

Another advantage of the invention is that the use of reducing agents is avoided; therefore, the process of the invention is environmentally friendly, safe, cost-effective and sustainable, as it does not produce wastewaters containing reducing agents.

When the process is carried out in standard dyeing conditions and the second dye precursors are indoxyl and/or derivatives thereof, their dimerization to indigo and/or derivatives thereof is spontaneous. Such spontaneous dimerization, according to the process of the invention, occurs after the solution comprising at least said indoxyl and/or derivatives thereof is contacted to the textile, which is spaced apart from the first immobilized enzyme. The process of the invention allows using enzymatic synthesis of indigo and/or derivatives thereof for dyeing textiles in industrial scale processes.

Advantageously, the process of the invention can be a continuous process. A continuous process may involve adding the first dye precursor upstream of step a) so that a solution comprising the dye precursor is contacted with the immobilized enzyme in continuous.

According to an embodiment of the process of the invention, the solution obtained after step d) is an exhaust solution that may comprise unreacted first dye precursor, which has not been converted to the second dye precursor in step a).

According to an embodiment of the process of the invention, at least part of the exhaust solution is directed back to the first immobilized enzyme after step d) to be recycled into the process. This embodiment allows converting unreacted first dye precursor that is present in the exhaust solution into the second dye precursor, which can then be subjected to steps b) to d) of the process of the invention. The present embodiment optimizes the use of said first dye precursor, as it can be converted entirely to said second dye precursor, for example by repeating the steps of the process, namely by directing the flow of the solution to contact the first immobilized enzymes several times. Repeating the steps of the process may provide different shades of color to the dyed textile; the process can thus can be carried out until the desired shade of color is obtained for the textile. Moreover, this embodiment allows avoiding the dispose of the exhaust solution that may still contain useful solutes, such as unreacted first dye precursor, buffer, co-factors, etc.

Moreover, first dye precursor can be added to the exhaust solution directed back to the immobilized enzyme after step d). This allows carrying out the process of the invention in continuous.

In the following paragraph, the process will be disclosed with reference to an embodiment where the insoluble dye is indigo, the second dye precursor is indoxyl, and the first dye precursor is indole. The scope of the invention is not limited to these exemplified compounds. According to an embodiment of the invention, said first immobilized enzyme is an oxidizing enzyme whereby indole and/or derivatives thereof are oxidized to obtain indoxyl and/or derivatives thereof when contacted by the oxidizing enzyme.

According to the present invention, "oxidizing enzymes" refers to any enzyme that is able to catalyze oxidation of its substrates, such as an oxidoreductase (EC 1). Suitable oxidoreductase is a monooxygenase (EC 1.13); it preferably is a flavin-containing monooxygenase (FMOs) (EC 1.14.13.8), and more preferably a microbial flavin-containing monooxygenase (mFMO). Alternatively, the monooxygenase can be a Baeyer-Villiger monooxygenase (BVMO). Monooxygenases, in particular FMOs and mFMOs, provide good conversion rates and binding of many first dye precursor, such as indole and/or many derivatives thereof, as well as a suitable specificity to convert most indole derivatives, and are thus beneficial for the invention. Baeyer-Villiger monooxygenases (BVMOs) have close homology to FMOs, and are thus beneficial as well for the invention. A particularly preferred oxidizing enzyme to be used in the invention is mFMO from *Methylophaga* sp., more preferably from the strain SK1. This type of mFMO is very soluble in aqueous solutions and can provide high concentration solutions, thus increasing the amount of second dye precursor 113, such as indoxyl and/or derivatives thereof, that can be synthesized by means of such type of mFMO. Moreover, this type of mFMO is able to convert most indole derivatives to the correspondent indoxyl derivative, as it is not specific just to indole or to one particular indole derivative. However, it is also encompassed in the scope of the invention any homologue of said *Methylophaga* sp. mFMO. Genetically modified enzymes, such as genetically modified oxidizing enzymes, can be used according to the present invention, e.g. to improve oxidation efficiency of the first dye precursor.

According to an embodiment of the invention, the process comprises using also a second immobilized enzyme, preferably an immobilized cofactor-regenerating enzyme.

According to the invention, the "second immobilized enzyme" may be any enzyme that is able to assist and/or complete the conversion of the first dye precursor to the second dye precursor catalyzed by the first immobilized enzyme. In particular, the second immobilized enzyme can assist such conversion by regenerating cofactor(s) used by the first immobilized enzyme; in such case, the second immobilized enzyme is an immobilized cofactor-regenerating enzyme.

According to the present invention, "cofactor-regenerating enzyme" is any enzyme that is able to regenerate (i.e. produce) cofactor(s) used by the first immobilized enzyme to catalyze the conversion reaction of the first dye precursor (step a) of the process of the invention).

The second immobilized enzyme may thus produce cofactor(s) used by the first immobilized enzyme starting from a substrate that is less expensive than the cofactor(s) used by said first immobilized enzyme.

Suitable cofactor-regenerating enzymes are known in the art and are e.g. a dehydrogenase, such as a glucose dehydrogenase (GDH), a phosphite dehydrogenase (PTDH), a formate dehydrogenase (FDH), and mutant thereof. Preferably, the cofactor-regenerating enzyme is a phosphite dehydrogenase (PTDH); an example of suitable PTDH is disclosed in WO 2004/108912 A2. Using dehydrogenases, such as GDH, FDH and in particular PTDH, is advantageous when an oxidizing enzyme, and in particular a FMO, is used as said first immobilized enzyme. GDH, FDH, and PTDH regenerate the cofactor(s) used by such oxidizing enzymes starting from, respectively, glucose, formate, and phosphite salts, which are significantly less expensive than the cofactor(s) used by said oxidizing enzymes, and widely available commercially. Genetically modified cofactor-regenerating enzymes can be used according to the present invention e.g. to improve cofactor regeneration efficiency of the first dye precursor.

Preferably, first and second enzymes are both immobilized to provide an enzymatic system.

According to an embodiment of the invention, the immobilized enzyme system is spaced apart from the textile and the solution flows from the enzymatic system of the textile. The invention process avoids or at least greatly reduces the precipitation of insoluble dye also at or near the immobilized enzyme system.

According to a further embodiment of the invention, the first immobilized enzyme and the second immobilized enzyme are provided as an immobilized fusion enzyme, and thus a fusion system is provided. Preferably, said first immobilized enzyme is an oxidizing enzyme, more preferably a monoxygenase, even more preferably a microbial flavin-containing monooxygenase (mFMO). Said second enzyme is preferably a cofactor-regenerating enzyme, more preferably a dehydrogenase, even more preferably is at least one dehydrogenase selected from the group consisting of: glucose dehydrogenase (GDH), phosphite dehydrogenase (PTDH), and formate dehydrogenase (FDH), and most preferably is a phosphite dehydrogenase (PTDH). Thus, according to a preferred embodiment, said fusion enzyme is PTDH-mFMO fusion enzyme.

Fusion of enzymes is a technique known in the art. Suitable fusion enzymes comprise a region deriving from the first enzyme and a region deriving from the second enzyme, each of the region providing the required functional properties.

The immobilization of the fusion enzymes can be carried out by means of surface-exposed groups on any region of the fusion enzymes, e.g. surface-exposed groups on the first enzyme region, or on the second enzyme region, or on both regions. The carriers can be chosen accordingly to the surface-exposed groups on any region of the fusion enzymes.

Mutant fusion enzymes can be employed in the process of the invention. Such mutant fusion enzymes are genetically modified in order e.g. to be immobilized more effectively or to improve the catalyzing efficiency.

In an embodiment, the first immobilized enzyme, or the enzyme system, is located in a first container, or chamber, and the textile is located in a second container, or chamber. Therefore, according to this embodiment, step a) is carried out in at least a first chamber, and the dyeing of at least part of said textile is carried out in at least a second chamber. Therefore, according to the said embodiment, conversion of the first dye precursor to the second dye precursor (step a) of the process of the invention) occurs in the first chamber, while conversion of said second dye precursor to said dye occurs in said second chamber, which is in fluid connection with said second chamber.

According to an embodiment, the first dye precursor can be produced enzymatically starting from one or more starting compounds. For example, indole (i.e., an exemplary first dye precursor) can be obtained enzymatically starting from tryptophan as starting compound.

According to embodiments, the first dye precursor is produced enzymatically starting from one or more starting compounds in one or more reactors different from the first and second chamber.

Advantageously, according to embodiments, such reactors may be in fluid connection with at least the first chamber.

According to embodiments, the first dye precursor is produced enzymatically starting from one or more starting compounds in the first chamber, above mentioned.

As used herein, the term "starting compound" refers to a compound that can be converted into a first dye precursor, as defined above, by one or more enzymatic reactions. Such enzymatic reactions are carried out by one or more starting enzymes. According to embodiments, the starting enzymes may be immobilized.

According to embodiments, a starting compound (e.g. tryptophan) may be enzymatically converted into a derivative thereof, e.g. a halogenated derivative.

As used herein, the term "starting enzyme" refers thus to one or more enzymes that can catalyze the conversion of a starting compound, e.g., tryptophan, to a first dye precursor, e.g. indole.

Scheme 6 below represents an illustrative reaction scheme wherein a first dye precursor (indole (II)) is obtained enzymatically starting from a starting compound (tryptophan (IV)):

Scheme 6

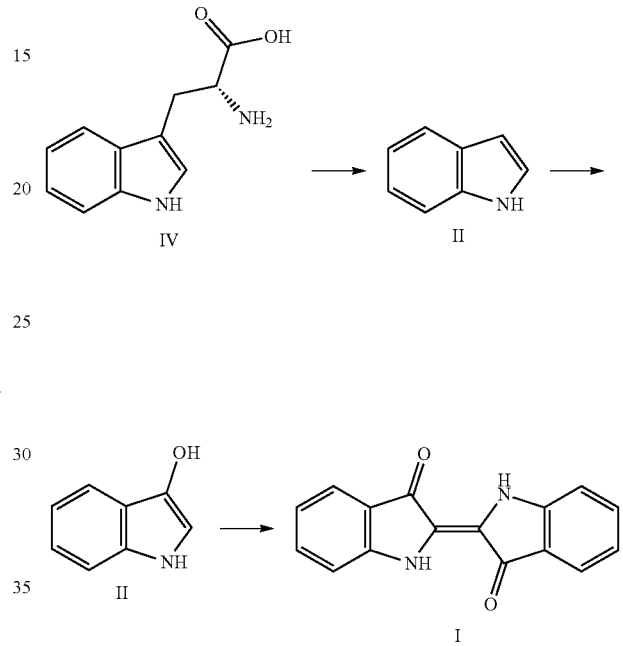

With reference to Scheme 6, compound IV is tryptophan (starting compound), compound II is indole (first dye precursor), compound III is indoxyl (second dye precursor) and compound I is indigo (insoluble dye). According to embodiments, the conversion of tryptophan to indole can be carried out by a starting enzyme such as tryptophanase or by a mutant form thereof (e.g. a mutant form having improved catalytic properties), while the conversions from first dye precursor to second dye precursor, and from second dye precursor to insoluble dye can be carried out as described above. The reaction of Scheme 6 can also be applied to tryptophan, indole, indoxyl and indigo derivatives.

As used herein, the term "Tryptophan derivative" refers to tryptophan substituted by one or more substituents, as above disclosed with reference to indole, indoxyl and indigo derivatives. For example, an illustrative reaction involving a tryptophan derivative, and the correspondent indole, indoxyl and indigo derivatives, is represented in Scheme 7. Scheme 7 represents an illustrative reaction wherein a starting compound (tryptophan (IV)) is converted into a halogenated derivative (6-bromotryptophan (IVd)). In this case, more than one starting enzymes are required to obtain the desired first dye precursor (6-bromoindole (IId)), i.e., a tryptophan halogenase and a tryptophanase.

Scheme 7

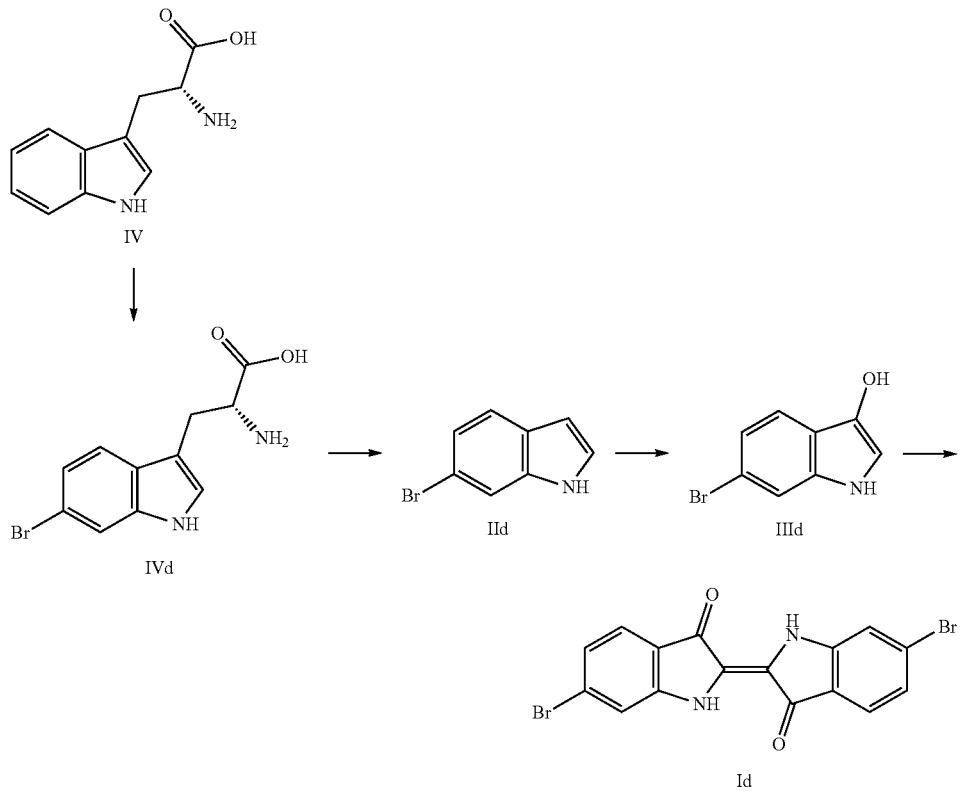

With reference to Scheme 7, compound IV is tryptophan (the starting compound), compound IVd is 6-bromotryptophan (halogenated derivative of the starting compound), compound IId is 6-bromoindole (first dye precursor), compound IIId is 6-bromoindoxyl (second dye precursor) and compound Id is 6,6'-dibromoindigo (also called Tyrian purple; insoluble dye). As above mentioned, the conversion of tryptophan to 6-bromotryptophan and conversion of 6-bromotryptophan to 6-bromoindole can be carried out by starting enzymes such as, respectively, tryptophan halogenase and tryptophanase, while the conversions from first dye precursor to second dye precursor, and from second dye precursor to insoluble dye can be carried out as described above.

According to embodiments, the insoluble dye is obtained by means of enzymatic cascade reaction steps (i.e. the enzymatic conversions that leads to the second dye precursor starting to the starting compound), followed by a non-enzymatic reaction step (i.e. the conversion from the second dye precursor to insoluble dye that occurs onto the textile).

Advantageously, by controlling the parameters of the process of the invention it is possible to obtain the conversion of the second dye precursor to insoluble dye directly onto the textile and to substantially avoid the precipitation of the insoluble dye at and/or near the enzymes.

According to embodiments, the process of the invention may further comprise the steps of contacting a solution comprising at least a starting compound with at least a starting enzyme, to convert at least part of such starting compound into a first dye precursor to obtain a solution comprising at least said first dye precursor, before that step a) is carried out.

A further object of the present invention is an apparatus to carry out a process for dyeing textiles, namely an apparatus for dyeing a textile comprising a first chamber containing at least a first immobilized enzyme and a solution comprising at least a dye precursor, at least a second chamber containing a textile, and means to generate a flow of a solution. The first chamber is in fluid connection to the second chamber, whereby the solution comprising at least a dye precursor can flow from the first chamber to the second chamber, where at least part of the dye precursor is converted to a dye to dye at least part of the textile. The second chamber optionally comprises outlet means to remove said solution from said second chamber.

According to a further embodiment of the invention, the apparatus further comprises:
  one or more reservoirs in fluid connection with at least the first chamber, so that a solution comprising a dye precursor can flow from the reservoir to the first chamber; and/or
  one or more collection tanks in fluid connection with the outlet means of the second chamber.

The reservoir according to the present embodiment can be set to provide a solution comprising at least a first dye precursor, such as the first dye precursor, to the apparatus of the invention, and in particular to the first chamber containing the first immobilized enzymes. Indeed, said reservoir can be set on purpose so that a user can feed easily solutions and/or solutes to the apparatus of the invention, such solutions and/or solutes being required to carry out the process of the invention by means of the apparatus of the invention. Therefore, solutions, for example comprising at least said first dye precursor, can be added to said reservoir, and such solution can then be fed to said first chamber containing said first immobilized enzymes (and eventually said second enzymes) by means of the fluid connection between said reservoir and said first chamber. The collection tank according to the present embodiment allows collecting the exhaust solution that is obtained once the textiles are dyed (such as after step d) of the process of the invention).

According to a further embodiment, the apparatus of the invention also comprises means to generate a flow of a solution. Said means to generate a flow of a solution, such as one or more pumps, allows the flow of solutions comprised in the apparatus of the invention.

According to embodiments, the apparatus may comprise also one or more reactors in fluid connection with the apparatus, preferably with the first chamber. Said one or more reactors may contain one or more starting enzymes and a solution comprising one or more starting compound.

According to embodiments, one or more starting enzymes and a solution comprising one or more starting compound may be contained in the first chamber to enzymatically produce the first dye precursor.

A further object of the present invention is an immobilized fusion enzyme, namely an immobilized fusion enzyme comprising a carrier and at least a fusion enzyme immobilized on said carrier, wherein said fusion enzyme is the PTDH-mFMO fusion enzyme.

The PTDH-mFMO fusion enzyme was found to be as particularly useful for carrying out the process of the invention, i.e. dyeing of textiles, in particular when said dyeing has to be carried out with indigo and/or derivatives thereof.

Another object of the present invention is the use of an immobilized fusion enzyme in the dyeing process of textiles, wherein said immobilized fusion enzyme is a regenerating enzyme-oxidizing enzyme fusion enzyme, preferably is the PTDH-mFMO fusion enzyme, i.e. the immobilized fusion enzyme according to the previous object of the invention.

Said immobilized fusion enzyme, in particular said immobilized PTDH-mFMO fusion enzyme, has been revealed particularly useful in dyeing processes (such as the dyeing process of the invention) wherein insoluble dyes, in particular wherein indigo and/or derivatives thereof, are used as dyes. Indeed, good reaction rates and yields in the oxygenation of first dye precursor, in particular of indole and/or derivatives thereof, are provided by said immobilized fusion enzyme, in particular by said immobilized PTDH-mFMO fusion enzyme. Therefore, said immobilized fusion enzymes, in particular said immobilized PTDH-mFMO fusion enzymes, are optimal for synthesizing insoluble dyes, in particular indigo and/or derivatives thereof, and to carry out dyeing processes according to the invention.

A further object of the present invention is a method for the production of indigo or an indigo derivative by enzymatic synthesis that comprises the following steps:
a') converting tryptophan or a tryptophan derivative in the presence of at least a tryptophanase, to obtain indole or an indole derivative;
b') hydroxylating said indole or said indole derivative obtained in step a') in the presence of at least an oxidizing enzyme, to obtain indoxyl or an indoxyl derivative; and
c') converting said indoxyl or said indoxyl derivative obtained in step b') to indigo or an indigo derivative.

The reaction scheme of the method of the invention is represented in Scheme 6 above.

The method of the invention provides the synthesis of indigo or an indigo derivative starting from tryptophan or a tryptophan derivative, by means of enzymatic cascade reaction steps (steps a') and b')) and a non-enzymatic step (step c')). The method of the invention is particularly advantageous to produce indigo and/or indigo derivatives, such as Tyrian purple, in a cost effective way.

Also, advantageously, the method of the invention allows the manufacturing of indigo and/or indigo derivatives on an industrial scale.

As used herein, "tryptophan derivative" refers to a tryptophan that is substituted by the groups and the positions as defined above with reference to indole and indoxyl derivatives.

The tryptophan derivative of step a') is preferably a tryptophan halogenated derivative, which can be obtained by halogenating tryptophan in the presence of at least a tryptophan halogenase and a halogen source. The reaction scheme of this embodiment is represented in Scheme 7 above (wherein the halogenated derivatives are the 6-bromo derivatives).

According to embodiments, tryptophan, can be used as a starting compound to enzymatically produce indigo and indigo derivatives. Advantageously, the use of tryptophan as starting compound allows for a cost effective production of indigo and/or indigo derivatives.

As used herein, "halogenated derivative" refers to any tryptophan, indole, indoxyl and indigo substituted by a halogen group, in particular fluoro, chloro, bromo or iodo groups, on one or more carbons in position 5, 6, 7 and 8 (and also 5', 6', 7' and 8' for indigo). For example, tryptophan halogenated derivatives are 6-bromotryptophan (compound IVd of Scheme 7 above) and 7-chlorotryptophan, indole halogenated derivatives are 6-bromoindole (compound IId of Scheme 7 above) and 7-chloroindole, indoxyl halogenated derivatives are 6-bromoindoxyl (compound IIId of Scheme 7 above) and 7-chloroindoxyl, and indigo halogenated derivatives are Tyrian purple (6,6'-dibromoindigo, compound Id of Scheme 7 above) and 7,7'-dichloroindigo.

According to embodiments, the enzymes employed in the method of the invention, as well as in the process of the invention, may be isolated enzymes, preferably as purified or semi-purified, whereby the method of the invention can be carried out without them being expressed in bacteria. Preferably, said isolated enzymes are immobilized enzymes.

The method of the invention can be carried out in one reactor, whereby providing a one pot reaction. This provide indigo or the derivative thereof as a solid precipitate after step c'), which can be isolated (e.g. filtered) from the reaction mixture. In other words, when the method of the invention is carried out according to a one pot reaction, the indigo or the derivative thereof obtained may be isolated and purified from the reaction mixture.

According to embodiments, step c') may be performed in the presence of a textile, so that at least part of the indigo or indigo derivatives that is obtained is deposited onto the textile.

According to embodiments, steps a') to c') are carried out in an aqueous medium and a flow of the aqueous medium is generated, whereby steps a') to c') are carried out in different reactors or in different locations of a reactor. This embodiment is advantageous for carrying out each step according to its optimal parameters, such as temperature, pH, amount of enzymes' substrates, etc.

According to exemplary embodiments, the method of the invention may be carried out in a two-stage packed-bed reactor, such as Spinchem® Rotating Bed Reactor (RBR).

The method of the invention is preferably carried out in an aqueous medium. Such aqueous medium has preferably a neutral or slightly basic pH, such as 7.0 to 10, preferably 7.4 or 8. Such aqueous medium can thus comprise a buffering agent, for example a potassium phosphate buffer. Some tryptophan derivative, such as 6-bromotryptophan, are poorly soluble in aqueous medium, and the method of the invention can be carried out with such tryptophan derivatives suspended in the aqueous medium.

Step a') involves the cleavage of a carbon-carbon bond on tryptophan or on the derivative thereof in the presence of a tryptophanase. Such tryptophan derivative is preferably synthesized by carrying out step a').

The reaction step of step a') is represented in Scheme 8:

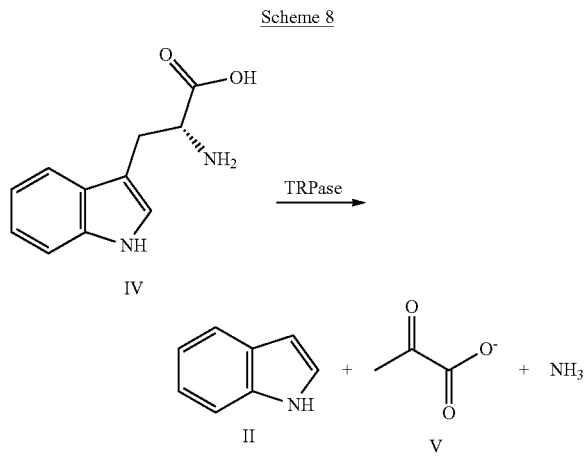

wherein compound IV is tryptophan, compound II is indole, compound V is pyruvate and TRPase is tryptophanase. It has been observed that tryptophanase can be used to catalyze the conversion of tryptophan derivatives to indole derivatives, such as the conversion of 6-bromotryptophan to 6-bromoindole.

Tryptophanases (systematic name: L-tryptophan indole-lyase (deaminating; pyruvate-forming)) are known enzymes that cleave a carbon-carbon bond of tryptophan, releasing indole. They may use pyridoxal phosphate (PLP) as cofactor. A tryptophanase suitable to be used in the method of the invention the tryptophanase of *Escherichia coli* NEB® 10β.

PLP can be optionally added to the reaction mixture of step a') to improve the yield of the conversion of tryptophan or of its derivatives.

Step b') of the invention involves the hydroxylation at least on the carbon in position 3 of the indole or its derivative obtained from step a') in the presence of oxidizing enzyme and $O_2$. Step b') thus provide indoxyl or its derivative.

Suitable oxidizing enzymes are the ones as described above, e.g. microbial FMO from *Methylophaga* sp strain SK1 and Baeyer-Villiger monooxygenase.

Oxidizing enzymes require $O_2$, i.e. oxygen, within the reaction mixture in order to catalyze the hydroxylation of indole or its derivative. The $O_2$ required for carrying out step b') can be the oxygen normally dissolved within the aqueous reaction mixture, or the reaction mixture can be saturated with $O_2$ in order to achieve maximum conversion of indole or its derivatives.

Step c') is non-enzymatic and involves the oxidation and dimerization of indoxyl or its derivatives to indigo or its derivatives.

According to embodiments, step c') of the method of the invention may be carried out in presence of a textile, which is spaced apart at least from said oxidizing enzyme, so that the production of indigo or indigo derivatives occurs directly onto the textile, whereby at least part of said textile is dyed. In this case, advantageously, precipitation of indigo or its derivative at and/or near the enzymes is substantially avoided.

Step c') can occur spontaneously after step b') (provided that $O_2$ concentration is in an adequate amount to oxidize indoxyl or its derivatives), or it can be driven (e.g. by adding $O_2$ to the reaction mixture).

The $O_2$ required to carry out step c') can be the oxygen normally dissolved within the aqueous reaction mixture, or the reaction mixture can be saturated with $O_2$ in order to achieve maximum conversion of indole or its derivatives.

In an embodiment, the tryptophan derivative of step a') is a tryptophan halogenated derivative that is obtained by a further step of i) halogenating tryptophan in the presence of at least a tryptophan halogenase.

Tryptophan halogenases are known enzymes able to catalyze the halogenation of tryptophan in various positions. Tryptophan halogenases are usually flavin-dependent halogenases, i.e. they use FAD or $FADH_2$ as a cofactor. Suitable tryptophan halogenases according to the method of the invention are thermophilic tryptophan halogenases, such as the thermophilic tryptophan halogenase of *Streptomyces violaceusniger*.

According to embodiments, the tryptophan halogenase is the thermophilic tryptophan halogenase of the strain SPC6 of *Streptomyces violaceusniger*.

For example, the thermophilic tryptophan halogenase may have the following sequence:

(SEQ. ID NO. 1)
LNNVVIVGGGTAGWMTASYLKAAFGDRIDITLVESGHIGAVGVGEATFS

DIRHFFEFLGLKEKDWMPACNATYKLAVRFENWREKGHYFYHPFEQMRS

VNGFPLTDWWLKQGPTDRFDKDCFVMASVIDAGLSPRHQDGTLIDQPFD

EGADEMQGLTMSEHQGKTQFPYAYQFEAALLAKYLTKYSVERGVKHIVD

DVREVSLDDRGWITGVRTGEHGDLTGDLFIDCTGFRGLLLNQALEEPFI

SYQDTLPNDSAVALQVPMDMERRGILPCTTATAQDAGWIWTIPLTGRVG

TGYVYAKDYLSPEEAERTLREFVGPAAADVEANHIRMRIGRSRNSWVKN

CVAIGLSSGFVEPLESTGIFFIHHAIEQLVKNFPAADWNSMHRDLYNSA

VSHVMDGVREFLVLHYVAAKRNDTQYWRDTKTRKIPDSLAERIEKWKVQ

LPDSETVYPYYHGLPPYSYMCILLGMGGIELKPSPALALADGGAAQREF

EQIRNKTQRLTEVLPKAYDYFTQ.

This type of tryptophan halogenase catalyze preferably the halogenation on the carbon in position 6 of tryptophan, whereby it is suitable to produce Tyrian purple (6,6'-dibromoindigo) according to the method of the invention.

Another tryptophan halogenase suitable for the method of the invention is tryptophan halogenase PrnA, preferably is the PrnA of *Pseudomonas fluorescens*, which catalyzes preferably the halogenation of tryptophan on the carbon in position 5 or 7 of the tryptophan.

For example, the tryptophan halogenase (PrnA) may have the following sequence:

```
                                        (SEQ. ID. NO. 2)
MNKPIKNIVIVGGGTAGWMAASYLVRALQQQVNITLIESAAIPRIGVGE

ATIPSLQKVFFDFLGIPEREWMPQVNGAFKAAIKFVNWRKPPDHSRDDY

FYHLFGSVPNCDGVPLTHYWLRKREQGFQQPMEYACYPQPGALDGKLAP

CLLDGTRQMSHAWHFDAHLVADFLKRWAVERGVNRVVDEVVEVRLNDRG

YISTLLTKEGRTLEGDLFIDCSGMRGLLINQALKEPFIDMSDYLLCDSA

VASAVPNDDVREGVEPYTSAIAMNSGWTWKIPMLGRFGSGYVFSSKFTS

RDQATADFLNLWGLSDNQSLNQIKFRVGRNKRAWVNNCVSIGLSSCFLE

PLESTGIYFIYAALYQLVKHFPDTSFDPRLSDAFNAEIVYMFDDCRDFV

QAHYFTTSREDTPFWLANRHELRLSDAIKEKVQRYKAGLPLTTTSFDDS

TYYETFDYEFKNFWLNGNYYCIFAGLGMLPDRSLPLLQHRPESIEKAEA

MFASIRREAERLRTSLPTNYDYLRSLRNGDAGQSRNQRGPTLAAKEGL.
```

According to embodiments, the tryptophan halogenase may be a genetically modified enzyme; in other words, the tryptophan halogenase may be in a mutant form. For example, the tryptophan halogenase may be a mutant form of the tryptophan halogenase of the strain SPC6 of *Streptomyces violaceusniger*, or a mutant form of the tryptophan halogenase PrnA.

The present embodiment requires a halogen source within the reaction mixture in order to be carried out, as tryptophan has to react with a halogen in presence of tryptophan halogenase to be converted to an indigo halogen derivative. Suitable halogen sources according to the method of the invention can be halogen salts, i.e. salts wherein the anion is halide ion. Suitable halogen salts can be magnesium, silver, sodium, potassium, lithium, and calcium halogen salts, for example NaCl, KCl, KI, LiCl, $CuCl_2$, $CuBr_2$, AgC, $CaCl_2$, $CaBr_2$, CIF, $MgCl_2$, $MgBr_2$, etc.

The present embodiment is advantageously carried out at temperature comprised in the range from 20° C. to 60° C., preferably from 25° C. to 40, more preferably at about 30° C., for a time comprised in the range of from 30 minutes to 4 hours, preferably from 1 hour to 3 hours, more preferably for about 2 hours.

According to embodiments, cofactor regenerating enzymes may be used to regenerate the cofactor(s) which may be needed by the enzymes used in the method of the invention.

According to embodiments, step b') may be carried out in the presence of at least an enzyme suitable for regenerating NADPH cofactor. Preferably, the enzyme suitable for regenerating NADPH cofactor is selected from the group consisting of glucose dehydrogenase (GDH), phosphite dehydrogenase (PTDH), and formate dehydrogenase (FDH) as described below, more preferably is PTDH as described below, whereby a FMO-NADPH regenerating enzyme system is provided. Advantageously, this embodiment provides for an enzyme system wherein expensive cofactors (i.e. NADPH) are regenerated by consuming cheaper cofactors (such as glucose, phosphite or formate). For example, oxidizing enzymes such as FMOs may use NADPH as cofactor which may be produced by the NADPH regenerating enzyme that uses cheap cofactors such as glucose, phosphite and formate.

In another embodiment, the halogenation of tryptophan to obtain its halogenated derivative is carried out in the presence of a flavin reductase and a NAD(P)H regenerating enzyme, preferably selected from the group consisting of glucose dehydrogenase (GDH), phosphite dehydrogenase (PTDH), and formate dehydrogenase (FDH), more preferably is PTDH, whereby a tryptophan halogenase-flavin reductase-NAD(P)H regenerating enzyme system is provided.

Flavin reductases (EC 1.5.1.30) are enzyme that catalyzes the following reaction:

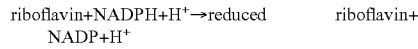
riboflavin+NADPH+H⁺→reduced riboflavin+ NADP+H⁺ while NAD(P)H regenerating enzymes are enzymes that produce NADH or NADPH, such as GDH, PTDH and FDH. Advantageously, this embodiment provides for an enzyme system wherein expensive cofactors (i.e. FAD and NADH or NADPH) are regenerated by consuming cheaper cofactors (such as glucose, phosphite or formate), improving the industrial feasibility of the method of the invention. For example, tryptophan halogenase may use FAD as cofactor which may be produced by the flavin reductase that may use NADH or NADPH as cofactor, which is produced by the NAD(P)H regenerating enzyme that uses cheap cofactors such as glucose, phosphite and formate.

Suitable flavin reductases useful for the method of the invention can be the flavin reductases of *Bacillus subtilis*, in particular the flavin reductases of the strain WU-S2B of *Bacillus subtilis*.

For example, the flavin reductases may have the following sequence: MKVLVLAFHPNMEQSVVNRAFADTLK-DAPGITLRDLYQEYPDEAIDVEKEQKLCEEHD RIVFQFPLYWYSSPPLLKKWLDHVLLYG-WAYGTNGTALRGKEFMVAVSAGAPEEAYQ AGGSN-HYAISELLRPFQATSNFIGTTYLP-PYVFYQAGTAGKSELAEGATQYREHVLKSF (SEQ. ID NO. 3).

Mutant forms of any enzyme employed in the method of the invention can be used to improve yields and industrial feasibility of the method of the invention.

For example, FMO mutations selected from the group consisting of W319A, C78I, C78I Y207W, and C78I Y207W W319F were found out to improve the catalyzing activity of FMO on 6-bromoindole. Moreover, the NADPH regenerating enzyme can be a mutant that has improved NADPH production, e.g. PTDH disclosed in WO 2004/108912 A2.

According to embodiments, when an enzyme requires a co-factor, such enzyme may be provided as a fusion enzyme with the co-factor-regenerating enzyme.

For example, tryptophan halogenase and flavin reductase can be provided as a fusion enzyme, and FMO and NADPH regenerating enzyme can be provided as a fusion enzyme, preferably as PTDH-FMO. According to this embodiment, only three individual enzymes can be employed in the method of the invention (when optional step i) is carried out), namely a tryptophan halogenase-flavin reductase fusion enzyme, a tryptophanase and a FMO-NADPH regenerating fusion enzyme. The NADPH regenerating portion of the latter fusion enzyme is able to regenerate the NADPH required for both the FMO region and the flavin reductase region of the fusion enzyme starting from its cheap substrate, i.e. phosphite.

Still a further object of the present invention is a dyed textile as obtainable through the process of the invention.

Also object of the present invention is a dyed textile as obtainable through the method of the invention when step c') of the method is carried out in the presence of a textile.

DESCRIPTION OF THE INVENTION

The objects and embodiments of the invention are now disclosed in more details with reference to the figures.

Figure 1:
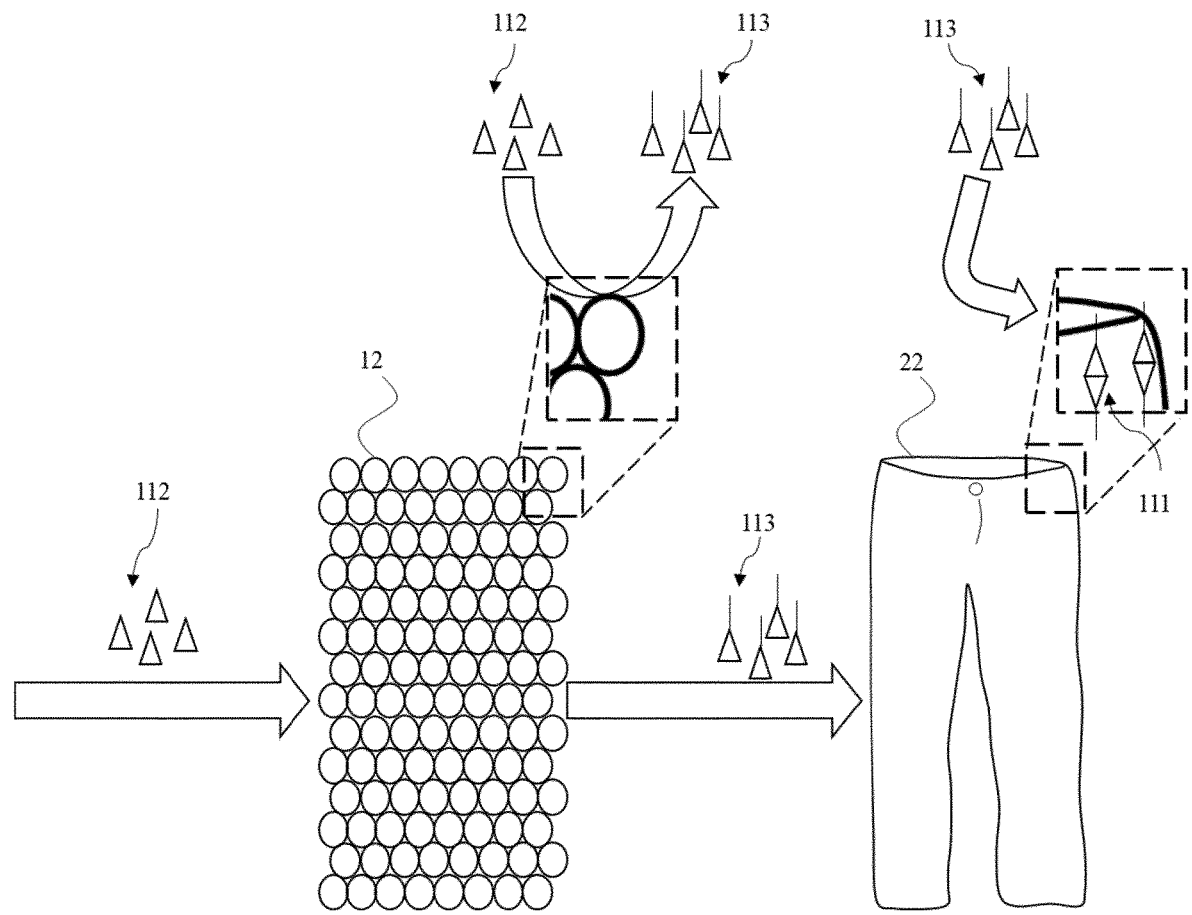
FIG. 1 is a schematic view of the process of the invention.

Object of the present invention is a process for dyeing a textile 22, comprising an enzymatic synthesis of a dye precursor, characterized in that it comprises the following steps:
a) contacting a solution comprising at least a first dye precursor 112 with at least a first immobilized enzyme 12, to convert at least part of said at least a first dye precursor 112 into at least a second dye precursor 113, to obtain a solution comprising said at least second dye precursor 113;
b) generating a flow of said solution comprising said at least second dye precursor 113, whereby said solution comprising said at least second dye precursor 113 flows from said first immobilized enzyme 12 to said textile;
c) contacting said solution comprising said at least second dye precursor 113 with said textile 22; and
d) converting at least part of said second dye precursor 113 to at least a dye 111, whereby at least part of said textile 22 is dyed;
wherein said at least first immobilized enzyme 12 is spaced apart from said textile 22, for example as represented on FIG. 1.

FIG. 1 represents a schematic view of the process of the invention, in particular is represented the conversion of said first dye precursor 112 to said second dye precursor 113 by means of said first immobilized enzymes 12, then the flow of the solution comprising at least said second dye precursor 113 to the textile 22 (which is spaced apart from said first immobilized enzyme 12), and finally the conversion of said second dye precursor 113 to said insoluble dye 111 directly onto said textiles 22.

More in particular, with reference to FIG. 1, the process of the invention will be disclosed with reference to the indole to indigo route. The process provides the dyeing of textiles 22 as a result of the following steps: a flow of a solution comprising indole dye precursor 112 is contacted with at least a first immobilized enzyme 12 or an enzymatic system (step a)), thus obtaining the conversion of at least part of indole into indoxyl 113, due to enzymatic catalysis. The solution is now comprising indoxyl 113. The flow of solution allows contact of solution comprising indoxyl 113 with the textile 22; advantageously, parameters, such as flow rate, are controlled in order to have the solution reaching said textile 22 immediately or shortly after indoxyl 113 is synthesized. Conversion of indoxyl 113 to indigo 111 can be thus obtained onto said textile 22, and dyeing of said textile 22 is achieved. In particular, when said solution comprising indoxyl 113 wets said textile 22, at least part of said indoxyl 113 is converted into indigo 111 directly onto said textile 22.

According to the present invention, the process provides for generating a flow of the solution initially to the enzymes 12 (or enzyme system) and then from the enzymes 12 (or enzyme system) to the textile 22, for example as shown by FIG. 1, wherein the straight arrows represent the direction of the flow of solution. Any direction of the flow of solution is possible, provided that such flow of solution is first fed to said enzymes 12, and then from said enzymes 12 to said textile 22. For example, another direction of the flow of solution can be from the bottom to the top when the first immobilized enzymes 12 are below said textile 22, or can be from top to bottom when the first immobilized enzymes 12 are above said textile 22, or can be circular when the first immobilized enzymes 12 and said textile 22 are housed within different areas of an annular chamber, such as a toroidal chamber, for example, when they are held in diametrically opposed areas within such toroidal chamber.

The use of a flow in the process of the invention prevents the precipitation of indigo 111 at and/or near the immobilized enzymes 12, as the solution comprising at least said second dye precursor 113 flows to said textile 22, which is spaced apart from said first immobilized enzyme 12, and then conversion of said second dye precursor 113 into said insoluble dye 111 occurs.

In particular, when said second dye precursor 113 can spontaneously convert into say insoluble dye 111, for example when said second dye precursor 113 is indoxyl and/or derivatives thereof and said insoluble dye 111 is indigo and/or derivatives thereof, a flow of the solution comprising at least said second dye precursor 113 is generated whereby said solution flows to said textile 22 before said second dye precursor 113 spontaneously converts and precipitate as said insoluble dye 111 at and/or near the immobilized oxidizing enzyme.

When said second dye precursor 113 does not spontaneously convert into said insoluble dye 111, or when it does not spontaneously convert in suitable amount, it is possible to change conditions, such as pH and/or temperature, and/or to add reagents, and/or supply with gasses, such as oxygen, where the textile 22 and said second dye precursor 113 are, in order to drive the conversion of said second dye precursor 113 to said insoluble dye 111 on the textile 22. Vice versa, the solution conditions may be controlled also in step a) of the process to prevent conversion until the solution has reached the textile.

Moreover, two or more different first dye precursors 112 can be contacted with the enzymes 12 according to step a) of the process, thus obtaining two or more different second dye precursors 113. Such two or more different second dye precursors 113 can then convert according to step d) of the process to obtain one or more different dyes 111 onto the textile 22; eventually, the conversion of step d) of such two or more different second dye precursors 113 can be achieved by adding further reactants, and/or by changing the parameters of the solution comprising them, if such conversion does not occur spontaneously, or if it does not occur in suitable amount. An illustrative example wherein two or more different dye precursors are contacted with the enzymes 12 is represented in Scheme 5 above. When two or more different first dye precursors 112 are used according to the process of the invention, two or more different enzymes 12 may be required; for example, when the two or more different first dye precursors 112 require different enzymatic reaction to be converted to the respective two or more different second dye precursors 113, or when the two or more different first dye precursors 112 cannot be substrates of the same enzymes 12.

The solution comprising at least a first dye precursor 112 can comprise also other solutes and is the solution that is contacted with the first immobilized enzyme 12 or the enzyme system in step a) of the process. The solution comprising at least a second dye precursor 113 is the solution obtained after at least part of said first dye precursor 112 is converted into said second dye precursor 113 after step a) and may comprise also other solutes, e.g. some unreacted first dye precursor 112.

As above mentioned, the solution according to the invention may comprise other functional solutes, such as salts, buffering agents, co-factors and oxygen and/or peroxide scavengers (e.g. catalases). Preferably, the concentration of substrates comprised in the aqueous solution saturate said catalyzing enzymes, so that said first immobilized enzymes can effectively catalyze a conversion of said first dye precursor 112 to the second dye precursor 113. An illustrative solution according to the present invention may comprise 100 mM potassium phosphate buffer pH 8.0, 0.5 M NaCl, 100 microM NADPH, 20 mM sodium-phospite and 1 nanoM bovine liver catalase with water as a solvent, when said first dye precursor 112 is indole, said first immobilized enzyme 12 is mFMO, and said second immobilized enzyme is PTDH.

The process of the invention can provide dyeing of textile 22 in batch or in continuous. To carry out the latter, addition of said first dye precursor 112, for example to the solution before step a), is required, so that a solution comprising at least a first dye precursor 112 is continuously contacted with said first immobilized enzymes 12 and the second dye precursor 113 is continuously synthesized. Said first dye precursor 112 is advantageously added keeping said first immobilized enzymes 12 saturated. Also addition of other solutes, for example before step a), could be required to carry out the process of the invention in continuous, such as cofactor(s), buffering agents, and oxygen.

Temperature and pH values according to the process of the invention can vary and can be those conventionally used in enzymatic synthesis of insoluble dyes.

The temperature of the solutions according to the process of the invention can be, for example, in the range comprised from 20 to 40, preferably from 25 to 30. pH of the solutions according to the process of the invention can be, for example, in the range comprised from 7.0 to 10.0, preferably from 7.5 to 9.0, even more preferably from 7.5 to 8.5, and most preferably is 8.0.

The contact time between said first immobilized enzyme 12 and said solution comprising indole 112 in step a) can be varied to achieve different shading of the dyed textile, and can be varied e.g. by varying the flow rate of the solution.

Oxygen concentration in the solution can be a relevant parameter for the overall dyeing process yield, as oxygen can take part in the conversion of the first dye precursor into the second dye precursor, and/or in the conversion of the second dye precursor into the insoluble dye (for example when the first dye precursor is indole and/or derivatives thereof, the second dye precursor is indoxyl and/or derivatives thereof, and the insoluble dye is indigo and/or derivatives thereof). Oxygen concentration in the solution can thus vary, for example, based on the amount of insoluble dye to be synthesized, or by the amount of textile to be dyed. The solution is advantageously saturated with oxygen in order to achieve maximum conversion of, for example, indole and/or derivatives thereof, and of indoxyl and/or derivatives thereof. Oxygen concentration is also advantageously monitored and controlled, and oxygen can be added when required in order to keep the solution saturated.

Other parameters of the process of the invention can be chosen according to, for example, which type of textile has to be dyed and which dye is chosen as a final dye.

Figure 2:
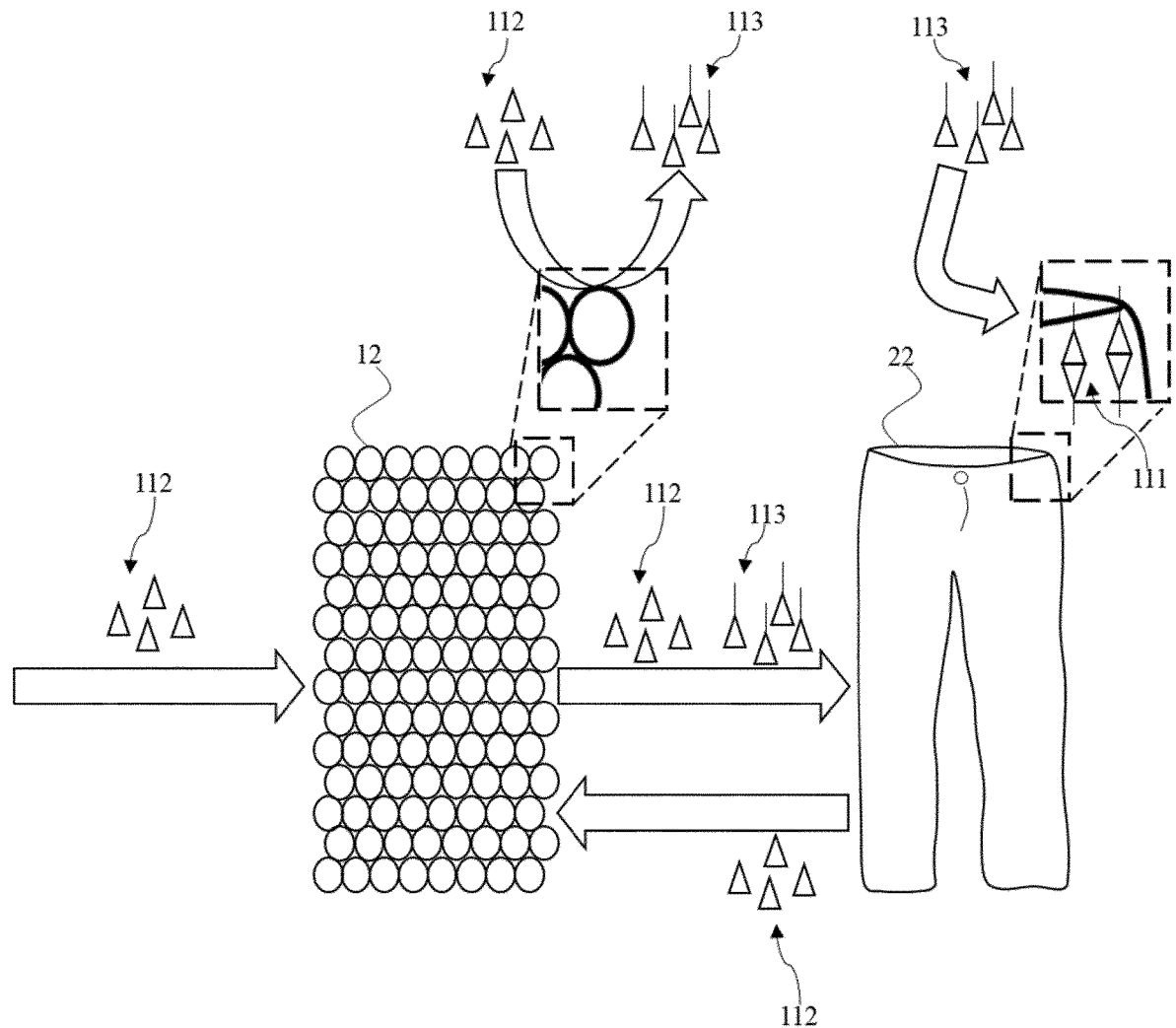
FIG. 2 schematically shows another embodiment of the process of the invention.

According to an embodiment of the process of the invention, a flow of a solution, a so called "exhaust solution", resulting from step d) is directed back to the chamber or areas housing the immobilized enzyme system. The exhaust solution is the solution obtained after at least part of indoxyl 113 is converted into indigo 111, which is fixed on said textiles 22, and may comprise unreacted first dye precursor 112, e.g. unreacted indole, in particular if said first dye precursor 112 did not react completely with said enzyme 12 in step a) of the process invention. This embodiment is shown in FIG. 2. The exhaust solution comprising indole is fed back directly or indirectly, continuously or batch-wise, to the enzyme system to react the remaining indole.

Preferably, the process provides a step of adding some first dye precursor 112 to the exhaust solution. Said first dye precursor 112 is advantageously added keeping said first immobilized enzymes 12 saturated. This can provide the process of the invention carried out in continuous.

In an embodiment of the invention, said first immobilized enzyme 12 is an oxidizing enzyme as previously defined. Use of oxygenases is particularly useful when said first dye precursor 112 has to be oxidized in order to be converted to said second dye precursor 113, e.g. when said first dye precursor 112 is indole and/or derivatives thereof, said second dye precursor 113 is indoxyl and/or derivatives thereof, and said insoluble dye 111 is indigo and/or derivatives thereof.

The process of the invention may further provide for a second immobilized enzyme, preferably an immobilized cofactor-regenerating enzyme as previously defined, to be present in the plant for dyeing. This provide an enzyme system wherein the first immobilized enzyme catalyzes the conversion of the first dye precursor 111 and the immobilized cofactor-regenerating enzyme regenerates the co-factor(s) needed by the first dye precursor 111. The carriers used to immobilize said second immobilized enzymes may be the same as the ones used to immobilize said first immobilized enzymes or may be different, depending on the surface-exposed groups of said second enzymes. If possible, the same carriers are used to immobilize both said first and second enzymes.

The type of said immobilized cofactor-regenerating enzyme depends on which cofactor(s) is used by said first immobilized enzyme 12. For example, when the first immobilized enzymes 12 are flavin-containing monooxygenases (FMO) (which use NADPH as cofactor), the immobilized cofactor-regenerating enzymes may be at least a dehydrogenase that generates NADPH, such as dehydrogenases selected from the group consisting of: glucose dehydrogenase (GDH), phosphite dehydrogenase (PTDH), and formate dehydrogenase (FDH). PTDH are soluble NADPH-regenerating enzymes obtainable for example from *Pseudomonas stutzeri*, that use phosphite as a substrate to catalyze the production of NADPH. The use of the FMO (preferably mFMO) along with the PTDH revealed to be effective in the synthesis of many second dye precursor 113, in particular of indoxyl and/or derivatives thereof, as it provides good oxidation rates and an efficient regeneration of NADPH.

The solutions used in the process and apparatus of the invention may also comprise cofactor(s) and/or substrates of said second immobilized enzymes. For example, if GDH, or PTDH, or FDH, is used as an immobilized cofactor-regenerating enzyme, the solutions may comprise also, respectively glucose, or phosphite salts, or formate (i.e. the substrates of, respectively, GDH, PTDH, and FDH).

Similarly to the first enzymes, mutant second enzymes (e.g. genetically modified second enzyme) can be employed in the process of the invention, for example to improve the regeneration of the desired cofactor(s) or to improve their binding properties to the carrier(s).

In an embodiment of the present invention, said first enzyme 12 and said second enzyme are provided as a fusion enzyme as previously defined. This provides an enzyme system.

Figure 3:
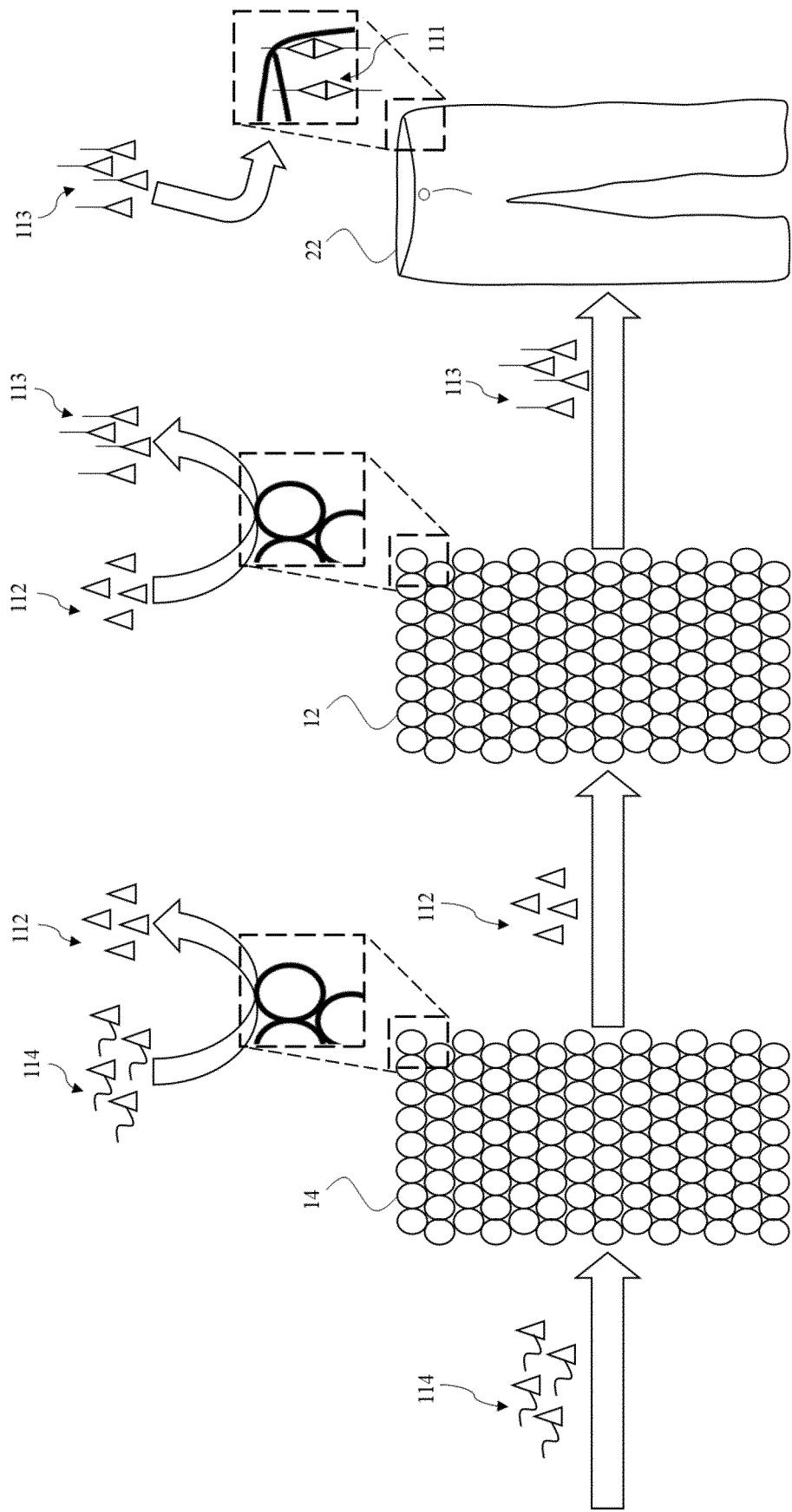
FIG. 3 schematically shows an embodiment of the process.

With reference to FIG. 3, another embodiment of the process of the invention is illustrated. Such embodiment provides for the production of the first dye precursor 112, e.g. indole, starting from one starting compound 114, e.g. tryptophan. A further step is comprised in the process of the invention according to the present embodiment, namely: contacting a solution comprising at least a starting compound 114 with at least a starting enzyme 14 to convert at least part of such starting compound 114 into the first dye precursor 112 to obtain a solution comprising such first dye precursor 112 so that steps a) to d) of the process of the invention can be carried out as already disclosed with reference to FIGS. 1 and 2. When the first immobilized enzyme 12 and the starting enzyme 14 are spaced apart, in order to contact the solution comprising the first dye precursor 112 (obtained by converting the starting compound 114) with the enzyme 12, a flow of such solution may be generated whereby such solution flows from the starting enzyme 14 to the first immobilized enzyme 12, for example as represented in FIG. 3. As the exhaust solution resulting from step d) may also comprise unreacted starting compound 114, circulating the exhaust solution back to the reactors or areas housing the starting enzymes 14 and/or the first chamber or areas housing the first immobilized enzymes 11 may be advantageous to optimize the conversion of unreacted starting compound 114 and/or first dye precursor 112.

In a further embodiment of the process of the invention, step a) is carried in a first chamber 11, and the dyeing of textile 22 is carried out in a second chamber 21. A solution comprising the first dye precursor 112 is provided inside the first chamber 11 whereby said solution contacts the first enzyme 12 contained in said first chamber 11 and the first dye precursor 112 is converted enzymatically to the second dye precursor 113. A flow of the solution is then generated and the solution, now comprising at least said second dye precursor 113, flows into said second chamber 21 containing textiles 22, whereby the solution and the second dye precursor 113 can contact and impregnate said textile 22. Finally, the second dye precursor 113 converts directly onto the textile 22 into the dye 111.

The flow of the solution is generated by any means suitable, e.g. a pump 50 or gravity (if the first chamber 11 is located above the second chamber 21).

First chamber 11 is a container suitable to contain enzymes 12 or enzyme system including the second immobilized enzymes and aqueous solutions. First chamber 11 can comprise also means to contain and restrain said first immobilized catalyzing enzymes 12 (and eventually, the enzyme system) inside it, for example one or more filters. Said first chamber 11 may advantageously comprise one or more means or sensors to allow monitoring parameters of the solution such as pH, temperature of the solution, oxygen concentration, flow rate, etc. The dimension, shape and material of said first chamber 11 can be chosen arbitrarily according to many factors, such as the amount of textiles 22 to be dyed and the dimension and shape of said second chamber 21.

Second chamber 21 is a container suitable to contain at least said textiles 22 and aqueous solutions, and wherein conversion of said second dye precursor 113 to said insoluble dye 111 can occur. The second chamber 21 may also comprise means that holds said textiles 22 in a predetermined position to allow a faster or more complete dyeing process. Said second chamber 21 may advantageously comprise one or more means or sensors that allow monitoring parameters of the solution such as pH, temperature of the solution, oxygen concentration, flow rate, etc. The dimension, shape and material of said second chamber 21 can be chosen according to many factors, such as the amount of textiles to be dyed, and the dimension and shape of said first chamber 11.

The first chamber 11 and the second chamber 21 may be thermally regulated individually, for example by means of jackets, e.g. water jackets.

Figure 4:
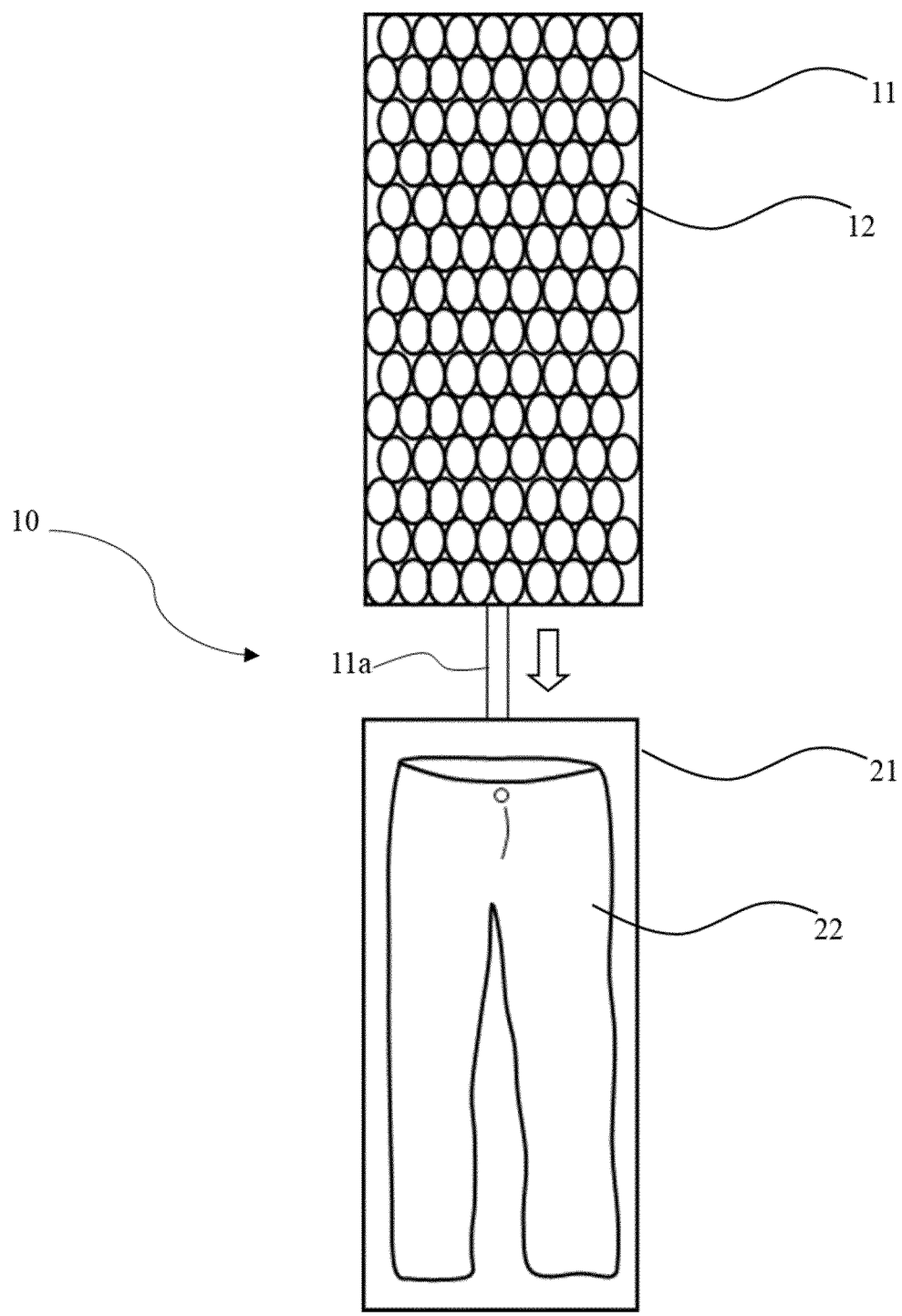
FIG. 4 is a schematic view of the apparatus 10.

In FIG. 4, the first chamber 11 is in fluid connection with the second chamber 21. Said fluid connection can be carried out by fluid connectors 11a such as tubes or pipes, which dimension, shape and material can be chosen by the skilled person to ensure the fluid connection between first and second chamber, and that they are able to effectively contain, and advantageously are inert to, the aqueous solutions that circulate in said first chamber 11 and in said second chamber 21. Such dimension, shape and material may vary arbitrarily according to, for example, the amount of textile to be dyed and the flow rate required for the solution. Said fluid connectors (e.g. tubes or pipes) may advantageously comprise probes to measure parameters such as flow rate, temperature, solution pH, and oxygen concentration, as well as portholes, round windows, and/or doors to monitor the process of the invention and to e.g. take samples of the solution.

Another object of the present invention is an apparatus 10 for dyeing a textile 22 comprising a first chamber 11 containing at least a first immobilized enzyme 12 and a solution comprising at least a dye precursor, at least a second chamber 21 containing a textile 22, and means to generate a flow of a solution 50, wherein said first chamber 11 is in fluid connection with said second chamber 21 whereby said solution comprising at least a dye precursor can flow from said first chamber 11 to said second chamber 21 where at least part of said dye precursor is converted to a dye 111 to dye at least part of said textile 22, for example as represented on FIG. 4. Said second chamber 21 optionally comprises also outlet means to remove said solution from said second chamber 21.

In particular, FIG. 4 shows said first chamber 11 containing said first immobilized enzymes 12 and said second chamber 21 containing said textiles 22. The straight arrow shows the flow of a solution comprising at least a dye precursor from said first chamber 11 to said second chamber 21. Within said second chamber, at least part of said second dye precursor 113 is converted to an insoluble dye 111 to dye at least part of a textile 22 contained in said second chamber 21.

Figure 5:
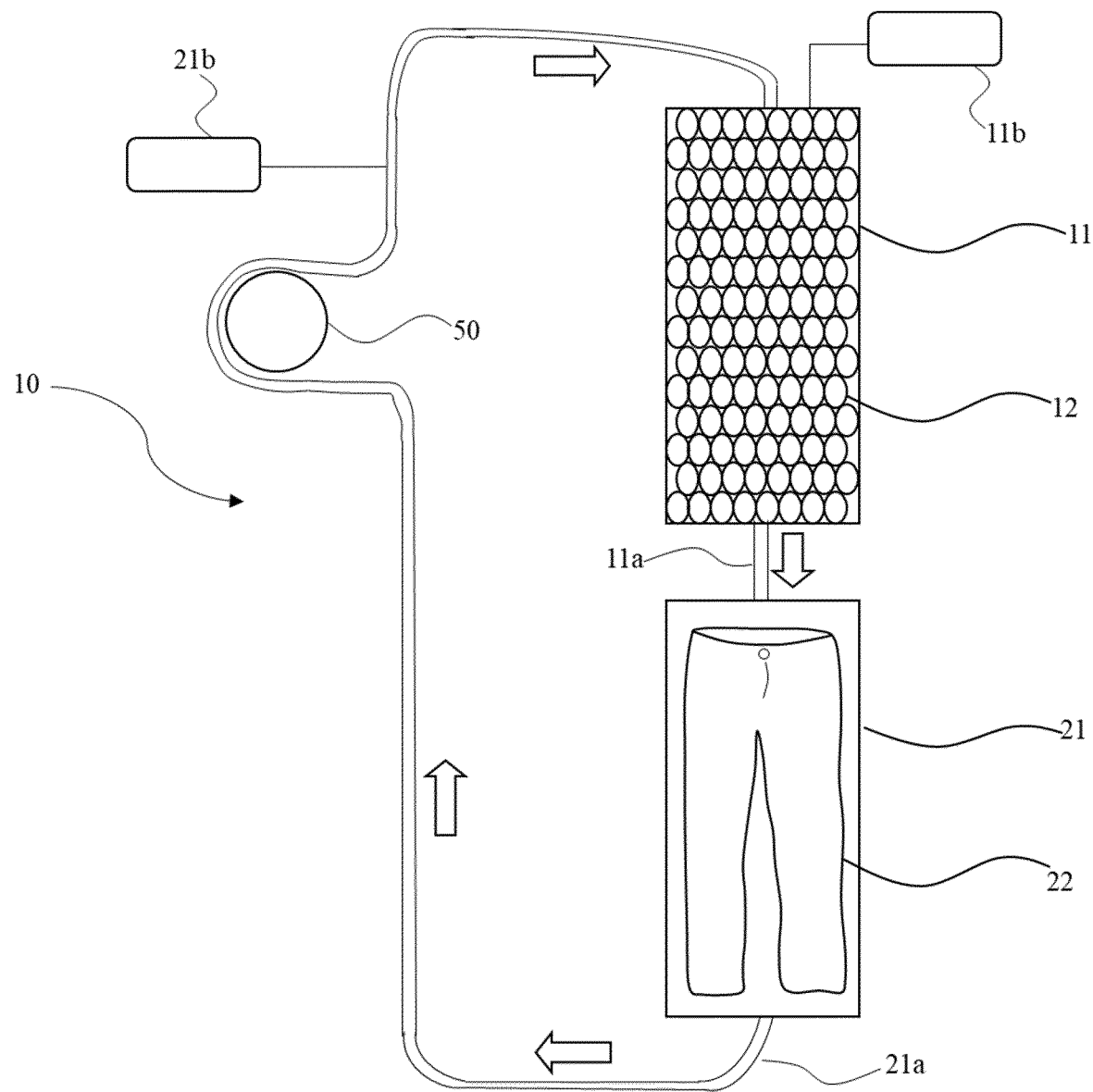
FIG. 5 is another schematic view of the apparatus 10.

FIG. 5 shows a schematic view of an embodiment of the apparatus 10, where the second chamber 21 has outlet means 21a, and wherein the outlet means 21a are in fluid connection with the first chamber 11. This allows the exhaust solution to be removed from said second chamber 21, and be subsequently fed to said first chamber 11 (as represented by the straight arrows of FIG. 5). Outlet means 21a may be any tubes or pipes, for example as described above.

To carry out the process of the invention in continuous when said apparatus 10 is used, is useful to keep providing cofactors and substrates to the first chamber 11 and the first immobilized enzymes 12, so that they can keep producing the second dye precursor 113. For this reason, compounds (e.g. cofactors and substrates) are added to said first chamber 11 and/or to the exhaust solution that flows back into the first chamber 11. The apparatus 10 of FIG. 5 is accordingly provided with means to carry out such addition, and comprises feeding means 11b connected to the first chamber 11 and/or feeding means 21b connected to the outlet means 21a.

In an embodiment of the apparatus 10 of the invention, a mean to generate a flow of a solution 50, such as a pump, is further comprised, allowing solutions comprised in the apparatus 10 of the invention to flow.

When the first immobilized enzyme 12 is not specific to just one substrate and thus is able to convert different first dye precursors 112, it is possible to provide different colors to the textiles 12 to be dyed just by changing the reagents fed to the apparatus 10. By changing first dye precursors 112 without changing the apparatus 10 and/or the enzymes 12 contained therein, different dyes 111 can be obtained; these dyes 111 are suitable to dye a textile 22 in the second chamber 21. For example, when the enzyme 12 contained in the first chamber 11 is the fusion enzyme PTDH-mFMO (which is able to convert indole as well as its derivatives), feeding a solution comprising indole to the apparatus 10 provides blue textiles. If in the same dyeing process a solution comprising 5-hydroxyindole replaces the solution comprising indole and is fed to the apparatus 10, a brown dye and a brown dyed textile is obtained.

Figure 6:
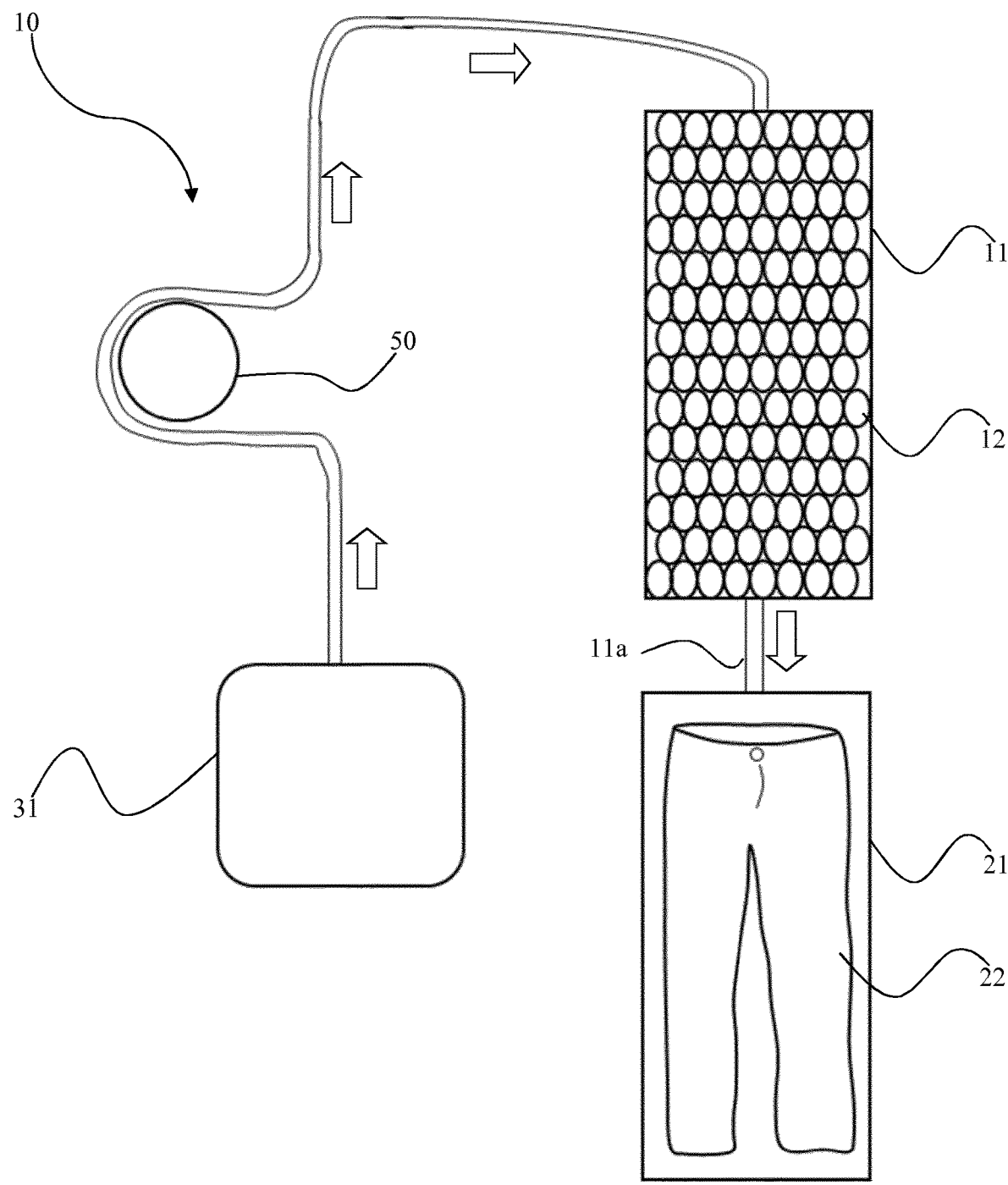
FIG. 6 schematically shows an embodiment of the apparatus 10, including a reservoir.
Figure 7:
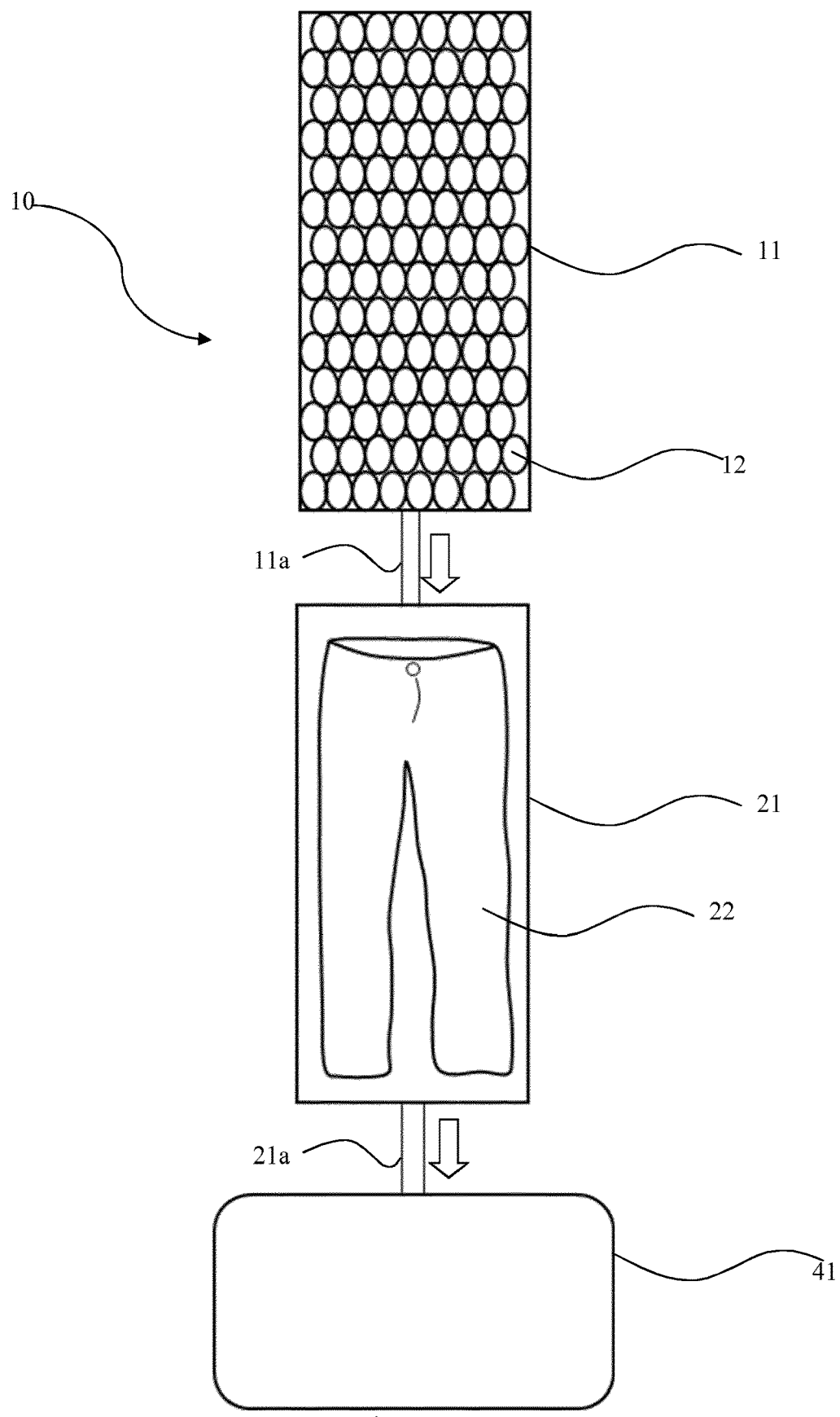
FIG. 7 schematically shows a further embodiment of the apparatus 10, including a collection tank.

FIG. 6 shows another embodiment of the apparatus 10 further comprising one reservoir 31 in fluidic connection with at least said first chamber 11, so that a solution comprising a dye precursor can flow from said reservoir 31 to said first chamber 11. FIG. 7 shows another embodiment of the apparatus 10 further comprising one collection tank 41 in fluidic connection with said outlet means 21a of said second chamber 21.

Reservoir 31 is any container that is able to contain aqueous solutions, such as a solution comprising at least said first dye precursor 112, such as indole and/or derivatives thereof. Reservoir 31 may be the container from which a solution comprising at least said first dye precursor 112 is fed the apparatus 10 in order to carry out the dyeing process of the invention. Therefore, reservoir 31 is advantageously set so that an operator can easily feed solutions and/or solutes therein, and its shape and dimension can be chosen accordingly. The apparatus 10 of FIG. 6 also comprises means 50 to generate a flow of a solution, such as a pump, in order to allow the solution to flow from reservoir 31 to first chamber 11, as represented by the straight arrows on FIG. 6, thus feeding a solution comprising first dye precursor 112 to first chamber 11.

Figure 8:
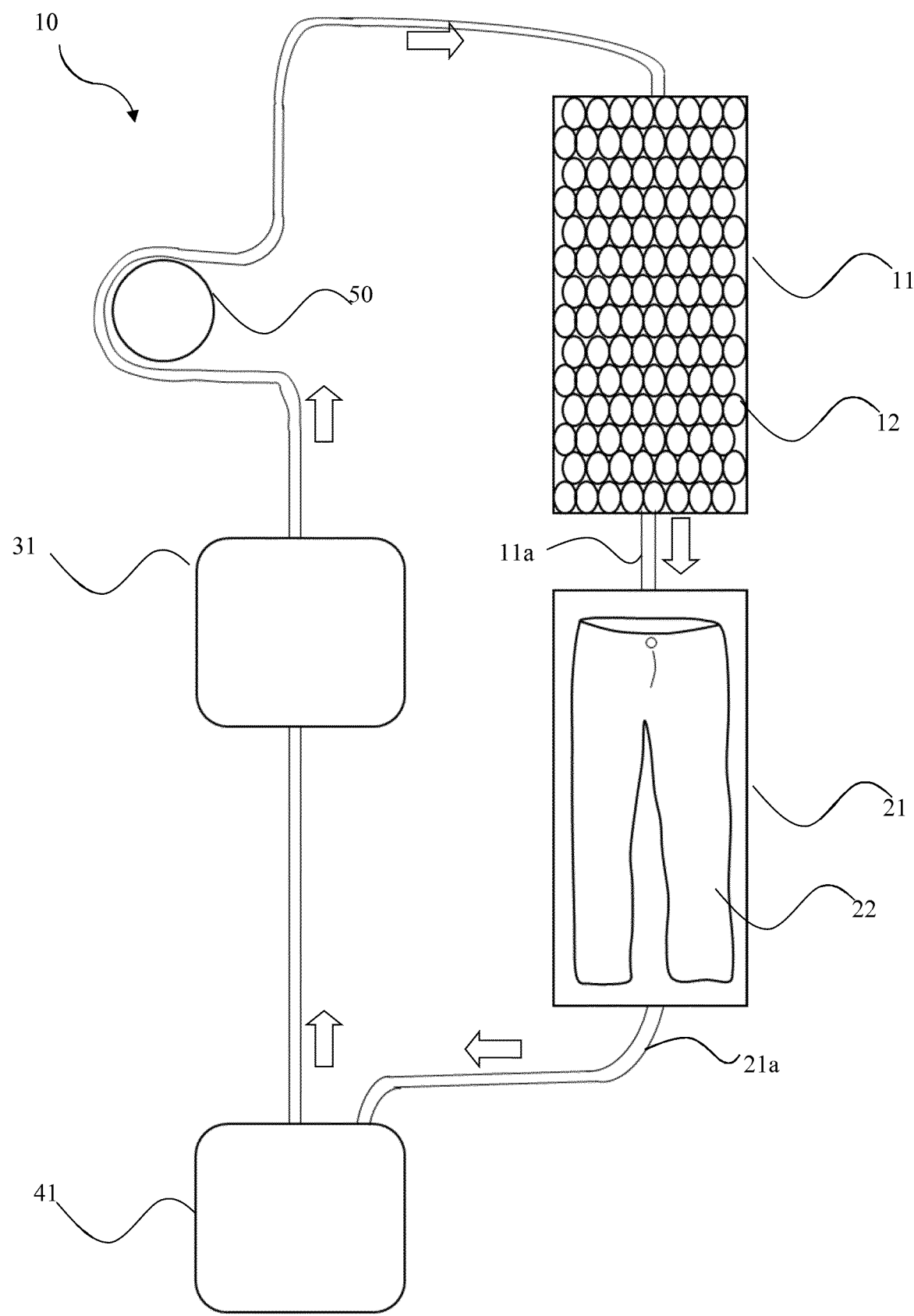
FIG. 8 schematically shows an embodiment of the apparatus 10.

FIG. 8 shows an apparatus 10 comprising both a reservoir 31 and a collection tank 41. The apparatus of FIG. 8 can be useful to carry out the dyeing process of the invention. A solution comprising at least a first dye precursor is provided in the reservoir 31. Then a flow of such solution is generated by the pump 50 and the solution flows to the first chamber 11 from said reservoir 31. Contacting of such solution with enzymes 12 is obtained within said first chamber 11. The solution, now comprising second dye precursor 113, flows from first chamber 11 to second chamber 21 wherein textiles 22 are located. At least part of said second dye precursor 113 is converted to the dye 111 to dye at least part of said textile 22 within said second chamber 21, and an exhaust solution is obtained. The exhaust solution is removed from the second chamber 21 through outlet means 21a and is collected in the collection tank 41. Collecting the exhaust solution could be advantageous, for example when such exhaust solution has to be treated to remove precipitates (such as insoluble dye 111) that might be present; such treatment can be carried out in the collection tank 41. The exhaust solution flows back to said first immobilized enzymes 12 comprised in said first chamber 11 (flowing through the reservoir 31) so that any unreacted first compound 112 in the solution can be contacted with said first immobilized enzymes 12. Solutes, such as the first dye precursor 111 and cofactors, may also be added to the solution by means of the reservoir 31. The apparatus 10 set as in FIG. 8 may be also provided by other means to carry out addition of solutes, for example feeding means 11b connected to the first chamber 11 and/or feeding means 21b connected to the outlet means 21a (not shown in FIG. 8).

More than one reservoirs 31 and/or more than one collection tanks 41 may be present in the apparatus 10 of the invention, and they can be set in series and/or in parallel.

Figure 9:
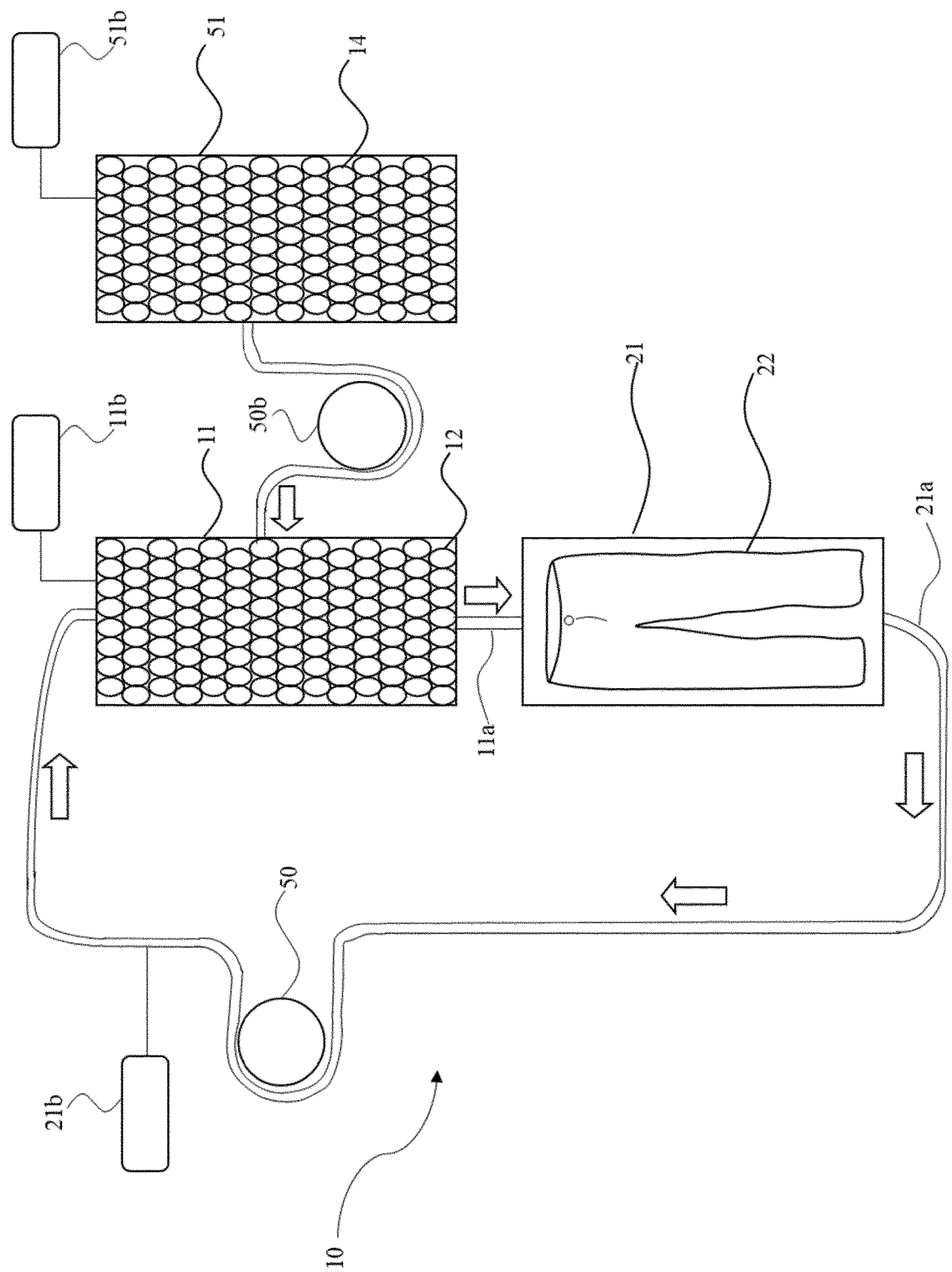
FIG. 9 schematically shows another embodiment of the apparatus 10.

In another embodiment, a reactor 51 for the production of the first dye precursor 112, e.g. indole, starting from one or more starting compound 114, e.g. tryptophan, is further comprised in the apparatus 10 of the invention, for example as represented on FIG. 9. Such reactor 51 contains at least the starting enzyme 14. A solution comprising a starting compound 114 can be fed to the reactor 51 by means of feeding means 51b whereby such solution is contacted with starting enzymes 14 and the starting compound 114 is converted to the first dye precursor 112. The solution comprising the first dye precursor 112 can be then flowed to the first chamber 11 by generating a flow of such solution by means of a second pump 50b. Once the solution comprising the first dye precursor 112 is flowed to the first chamber 11, steps a) to d) of the process of the invention can be carried out. FIG. 9 represents an embodiment wherein the reactor 51 is set in parallel with respect to the flow of the solution flowing from the first chamber 11 to the second chamber 21; however embodiments wherein one or more reactors 51 are set in series with respect to such flow of the solution, preferably are set upstream of the first chamber 11, are encompassed by the present invention.

The invention claimed is:

1. A process for dyeing a textile (22), comprising an enzymatic synthesis of a dye precursor, characterized in that it comprises the following steps:
   a) contacting a solution comprising at least a first dye precursor (112) with at least a first immobilized enzyme (12), to convert at least part of said first dye precursor (112) into at least a second dye precursor (113), to obtain a solution comprising said at least second dye precursor (113);
   b) generating a flow of said solution comprising said second dye precursor (113), whereby said solution comprising said second dye precursor (113) flows from said first immobilized enzyme (12) to said textile (22);
   c) contacting said solution comprising said second dye precursor (113) with said textile (22); and
   d) converting at least part of said second dye precursor (113) to at least one dye (111), whereby at least part of said textile (22) is dyed;
   wherein said first immobilized enzyme (12) is spaced apart from said textile (22);
   wherein said at least first dye precursor (112) is indole and/or derivatives thereof, said at least second dye precursor (113) is indoxyl and/or derivatives thereof, and said at least dye (111) is indigo and/or derivatives thereof;
   wherein said first immobilized enzyme is an oxidizing enzyme, whereby said first dye precursor is oxidized to obtain said second dye precursor when contacted by said oxidizing enzyme; and
   wherein the pH of said solutions is in the range comprised from 7.0 to 10.0, whereby dimerization of said indoxyl and/or derivatives thereof to indigo and/or derivatives thereof occurs after said solution comprising at least said indoxyl and/or derivatives thereof is contacted to said textile.

2. A process according to claim 1, wherein an exhaust solution is obtained in step d), and a flow of said exhaust solution is generated whereby said exhaust solution flows to said at least first immobilized enzyme (12).

3. A process according to claim 1, further comprising an immobilized cofactor-regenerating enzyme.

4. A process according to claim 3, wherein said cofactor-regenerating enzyme is a dehydrogenase selected from the group consisting of: glucose dehydrogenase (GDH), phosphite dehydrogenase (PTDH), and formate dehydrogenase (FDH.

5. A process according to claim 3, wherein said first immobilized enzyme and said second immobilized enzyme are provided as an immobilized fusion enzyme.

6. A process according to claim 1, wherein oxygen is added to said solution.

7. A process according to claim 1, wherein step a) is carried out in at least a first chamber (11), and wherein the dyeing of at least part of said textile (22) is carried out in at least a second chamber (21).

8. A process according to claim 7, wherein said first dye precursor (112) is produced enzymatically starting from one or more starting compounds (114) in one or more reactors (51) different from said first chamber (11) and said second chamber (21).

9. A process according to claim 7, wherein said first dye precursor (112) is produced enzymatically starting from one or more starting compounds (114) in said first chamber (11).

10. A process according to claim 1, wherein said first immobilized enzyme is a monooxygenase.

11. A process according to claim 5, wherein said fusion enzyme is PTDH-mFMO.

* * * * *